United States Patent [19]
Inada et al.

[11] Patent Number: 5,144,684
[45] Date of Patent: Sep. 1, 1992

[54] PARALLEL IMAGE PROCESSING APPARATUS USING EDGE DETECTION LAYER

[75] Inventors: Toshio Inada, Sagamihara; Yukio Ogura, Yokohama; Junichi Kitabayashi, Kawasaki, all of Japan

[73] Assignee: Ricoh Company, Ltd., Japan

[21] Appl. No.: 501,806

[22] Filed: Mar. 30, 1990

[30] Foreign Application Priority Data

| Apr. 3, 1989 | [JP] | Japan | 1-84398 |
| May 17, 1989 | [JP] | Japan | 1-123363 |
| Jun. 13, 1989 | [JP] | Japan | 1-149968 |
| Jul. 11, 1989 | [JP] | Japan | 1-178770 |
| Sep. 27, 1989 | [JP] | Japan | 1-251268 |

[51] Int. Cl.$^5$ ............................................. G06K 9/48
[52] U.S. Cl. ................................. 382/22; 382/49; 382/67; 382/68; 250/208.1
[58] Field of Search .................. 382/22, 28, 27, 54, 382/68, 67, 49; 250/208.1, 553; 357/30 D, 30 G, 30 H, 30 S; 359/599

[56] References Cited

U.S. PATENT DOCUMENTS

| 3,187,304 | 6/1965 | Taylor | 382/54 |
| 3,297,993 | 1/1967 | Clopper | 382/22 |
| 3,701,095 | 10/1972 | Yamaguchi et al. | 382/49 |
| 3,964,021 | 6/1976 | Tomches | 382/49 |
| 4,363,104 | 12/1982 | Nussmeier | 382/54 |
| 4,380,755 | 4/1983 | Endlicher et al. | 382/68 |
| 4,547,896 | 10/1985 | Ohtombe et al. | 382/67 |
| 4,661,984 | 4/1987 | Bentley | 382/8 |
| 4,985,618 | 1/1991 | Inada et al. | 382/54 |

FOREIGN PATENT DOCUMENTS

50-34901 11/1975 Japan .

Primary Examiner—David K. Moore
Assistant Examiner—Barry Stellrecht
Attorney, Agent, or Firm—Mason, Fenwick & Lawrence

[57] ABSTRACT

A parallel image processing apparatus includes (1) a light diffusing layer, (2) a photoelectric conversion layer which receives diffused light from the diffusion layer, and (3) an edge detection layer which receives signals from conversion elements in the conversion layer, and generates edge information which defines the edge of object(s) imaged on the light diffusing layer. The conversion layer includes pairs of conversion elements, the pairs having a center element and a peripheral element surrounding it. Signals from one or more center elements are summed, the sum being differentially amplified with a sum of signals from one or more peripheral elements to arrive at an edge signal. Edge signals may be used to differentiate among characters, pictures or photographs, and a blank images.

21 Claims, 23 Drawing Sheets

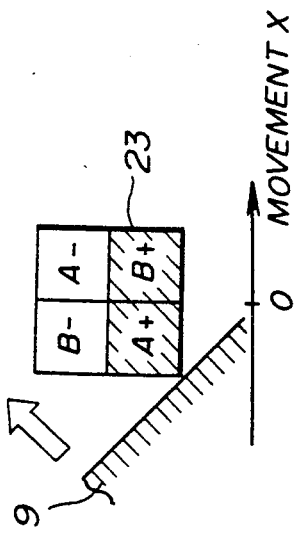
FIG. IIA
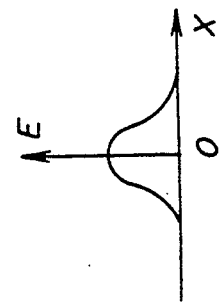
FIG. IIB
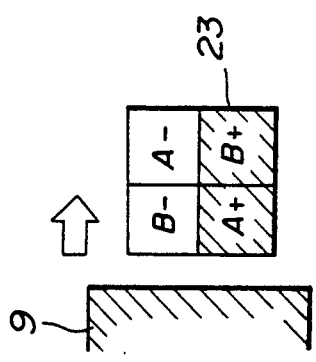
FIG. IOA
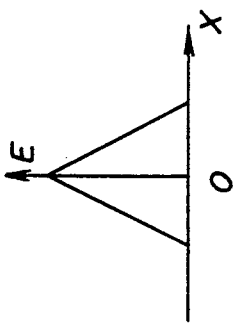
FIG. IOB
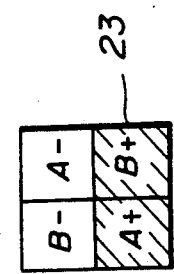
FIG. 9

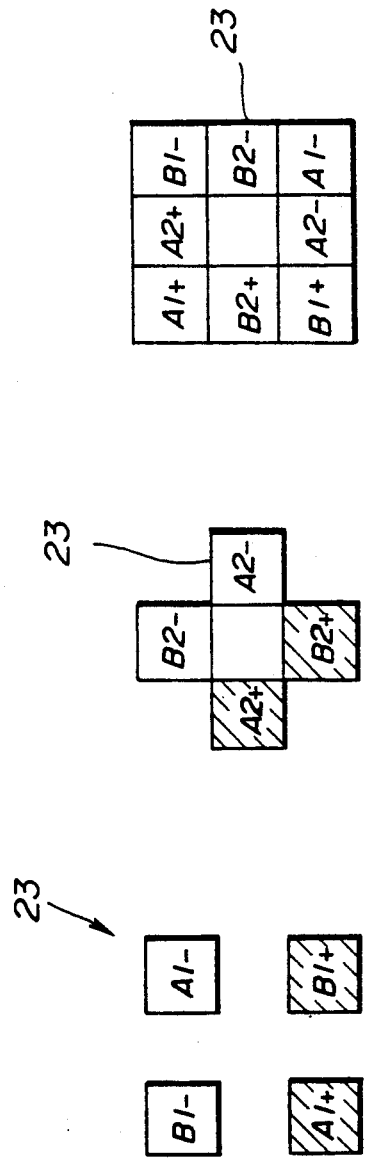

FIG. 42
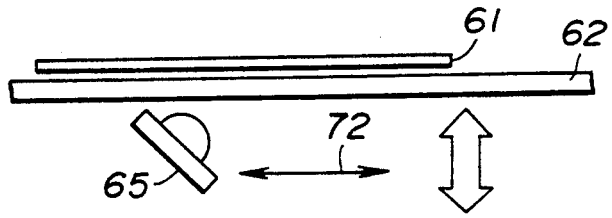
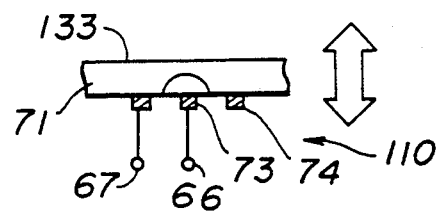
FIG. 43
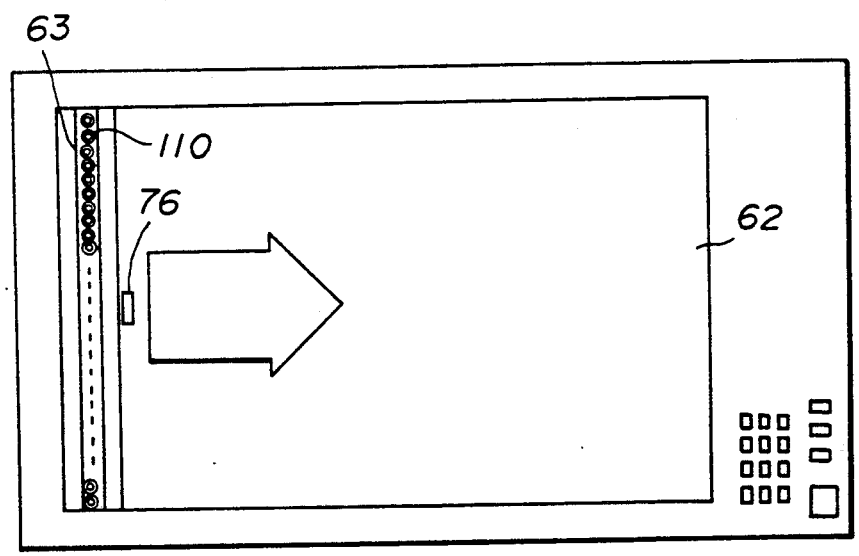
FIG. 44

PARALLEL IMAGE PROCESSING APPARATUS USING EDGE DETECTION LAYER

BACKGROUND OF THE INVENTION

The present invention generally relates to parallel image processing apparatuses, and more particularly to a parallel image processing apparatus which detects edge information and is suited for use in an artificial visual device of a robot and the like.

When recognizing a pattern of a graphic information, it is necessary to recognize the feature of the pattern. When making such a feature recognition, it is useful to elucidate the feature extracting mechanism of a living body, so as to design a parallel image processing apparatus which utilizes the nerve cells of a visual nervous system in the living body. In other words, this parallel image processing apparatus uses the visual system of the living body as a model, and is provided with a light receiving layer and a threshold element layer. The light receiving layer includes a large number of light receiving elements for detecting an input image, and the light receiving elements are arranged two-dimensionally in a matrix arrangement. The threshold element layer includes a large number of threshold elements for receiving outputs of the light receiving elements, and the threshold elements are arranged two-dimensionally in a matrix arrangement. Each threshold element generates an output equal to a function of a weighted sum of the received inputs. This parallel image processing apparatus outputs an edge information which corresponds to the input image. A parallel image processing apparatus of this type is proposed in a Japanese Published Patent Application No. 50-34901.

Next, a description will be given of the conventional parallel image processing apparatus and the structure of the threshold element which has the edge detection function in particular. The threshold element receives the outputs of a plurality of light receiving elements. For the sake of convenience, it is assumed that the a photoelectric conversion cell such as a photodiode is used for the light receiving element and an edge detection cell is used for the threshold element.

FIG. 1 shows a photoelectric conversion cell layer 1 as one example of the light receiving layer. The photoelectric conversion cell layer 1 includes a large number of photoelectric conversion cells (light receiving elements) 2 which are arranged two-dimensionally in a matrix arrangement on an image formation plane of an image pickup lens 3 which is provided to pick up an input image. Hence, an image corresponding to the input image is formed on the photoelectric conversion cell layer 1, and each photoelectric conversion cell 2 outputs an electrical signal which is dependent on a light intensity at a two-dimensional coordinate on the photoelectric conversion cell layer 1. The output signals of the photoelectric conversion cells 2 can be treated independently.

FIG. 2 shows an edge detection cell layer (threshold element layer) 4 which is used in combination with the photoelectric conversion cell layer 1. The edge detection cell layer 4 includes a large number of edge detection cells (threshold elements) 5 which are arranged two-dimensionally in a matrix arrangement. Each edge detection cell 5 receives the output signals of a plurality of photoelectric conversion cells 2 and outputs a signal which is equal to a function of a weighted sum of the received signals.

For example, as shown in FIG. 3 on an enlarged scale, each edge detection cell 5 is arranged to receive the output signals of nine photoelectric conversion cells 2 which are arranged in a 3×3 matrix and constitute a unit receptive region 6. The nine photoelectric conversion cells 2 constituting the unit receptive region 6 are labeled as cells $PD_{11}$, $PF_{12}$, $PD_{13}$, $PD_{21}$, $PD_{22}$, $PD_{23}$, $PD_{31}$, $PD_{32}$ and $PD_{33}$. As indicated by a hatching in FIGS. 2, 3, 4 and 5A, the cell $PD_{22}$ is a center cell which is located at the center of the unit receptive region 6, and the remaining cells $PD_{11}$ through $PD_{21}$ and $PD_{23}$ through $PD_{33}$ are peripheral cells which are located at the periphery of the unit receptive region 6. The unit receptive region 6 overlaps an adjacent unit receptive region 6.

The center cell supplies a positive potential to a corresponding edge detection cell when the center cell receives light. On the other hand, the peripheral cell supplies a negative potential to a corresponding edge detection cell when the peripheral cell receives light, For this reason, when a signal processing system for one lie is considered, the output signals of the peripheral cells $PD_{21}$ and $PD_{23}$ are added in an adder 7 as shown in FIG. 4 and an output signal of the adder 7 is inverted by an inverter 8. An output signal of the inverter 8 is supplied to a corresponding edge detection cell 5 together with a direct signal from the center cell $PD_{22}$. An edge detection cell (threshold cell) having such an input characteristic is referred to as a threshold element having a ON centered receptive field. FIG. 5A shows the nine cells $PD_{11}$ through $PD_{33}$ which are arranged in the 3×3 matrix, and FIG. 5B shows a processing according to the ON centered receptive field system when the unit receptive region 6 is constituted by the nine cells $PD_{11}$ through $PD_{33}$.

A description will be given of the processing for the case where the unit receptive region 6 is constituted by the 3×3 matrix arrangement of the cells, by referring to formulas. First, when the output signals of the cells $PD_{11}$ through $PD_{33}$ are respectively denoted by $U_{11}^O$ through $U_{33}^O$ and weighting coefficients with respect to the output signals $U_{11}^O$ through $U_{33}^O$ at the time of the input are respectively denoted by $C_{11}$ through $C_{33}$, an input $IN_{ij}^1$ to the edge detection cell 5 can be described as follows.

$$IN_{ij}^1 = U_{11}^O C_{11} + U_{12}^O C_{12} + \ldots + U_{22}^O C_{22} + H_{32}^O C_{32} + U_{33}^O C_{33}$$

With regard to the weighting coefficients $C_{11}$ through $C_{33}$, the following relationships stand because the unit receptive region 6 is ON centered, where Ch and Ce satisfy a relationship $|8Ch| = |Ce|$.

$$C_{11} = C_{12} = C_{13} = C_{21} = C_{23} = C_{31} = C_{32} = C_{33} = Ch < 0$$

$$C_{22} = Ce > 0$$

As a result, the output signal $U_{ij}^1$ can be described by the following function.

$$U_{ij}^1 = |(1+e)/(1+h) - 1| = |(e-h)/(1+h)|$$

In the above function, e and h are defined as follows.

$$e = U_{22}^0 C_{22}$$

$$h = U_{11}^0 C_{11} + U_{12}^0 C_{12} + U_{13}^0 C_{13} + U_{21}^0 C_{21} + U_{23}^0 C_{23} +$$
$$U_{31}^0 C_{31} + U_{32}^0 C_{32} + U_{33}^0 C_{33}$$

When an edge of an image exists within the unit receptive region 6 which is constituted by the 3 ×3 matrix arrangement of the cells and a ratio of the light quantity $U_{22}^O$ which is received by the center cell $PD_{22}$ to the light quantities $U_{11}^O$ through $U_{21}^O$ and $U_{23}^O$ through $U_{33}^O$ received by the respective peripheral cells $PD_{11}$ through $PD_{21}$ and $PD_{23}$ through $PD_{33}$ is not 1:8, the edge detection cell 5 which corresponds to the unit receptive region 6 outputs the signal $U_{ij}^1$. Hence, the edge detection cell 5 has the edge detection capability.

Next, a more detailed description will be given with reference to FIGS. 6A through 6C. One edge detection cell 5 is coupled to the nine photoelectric conversion cells $PD_{111}$ through $PD_{33}$ which are arranged in the 3×3 matrix and correspond to the unit receptive region 6. The edge detection capability of the edge detection cell 5 can be evaluated by the output thereof when a shield plate 9 which corresponds to the image moves in a direction x from left to right in FIG. 10A and the shielding area with respect to the unit receptive region 6 is successively increased. When the movement of the shield plate 9 is regarded as the describing the coordinate of the shielding boundary and changes in the value (relative value) $e-h$ and the value $|e-h|$ (relative value) which are involved in the output signal $U_{ij}^1$ are described, it is possible to obtain FIG. 6B for the value $e-h$ and FIG. 6C for the value $|e-h|$. First, the shield plate 9 begins to shield the unit receptive region 6, and the value $|e-h|$ increases proportionally to the shielding area until the cells $PD_{11}$, $PD_{21}$ and $PD_{31}$ of the leftmost column are completely shielded. Furthermore, as the shielding progresses and the cells $PD_{12}$, $PD_{22}$ and $PD_{32}$ of the central column are shielded, the value of e, that is, the decrease in the output signal of the center cell $PD_{22}$ becomes dominant. The value of $|e-h|$ becomes 0 (zero) when exactly ½ of the central column made up of the cells $PD_{12}$, $PD_{22}$ and $PD_{32}$ is shielded. When the central column made up of the cells $PD_{12}$, $PD_{22}$ and $PD_{32}$ is completely shielded, the value of $|e-h|$ is determined by the output values of the remaining cells $PD_{13}$, $PD_{23}$ and $PD_{33}$. As the shielding progresses further and the cells $PD_{13}$, $PD_{23}$ and $PD_{33}$ of the rightmost column are shielded, the value of $|e-h|$ decreases proportionally to the shielding area.

Therefore, according to the conventional edge detection method uses the ON centered receptive field in which the center element out of the plurality of light receiving elements supplies a positive signal to a corresponding threshold element upon receipt of light and the peripheral elements out of the plurality of light receiving elements supply negative signals to the corresponding threshold elements upon receipt of light. The signal from the center element and the signals from the peripheral elements are weighted and an absolute value of a difference between the signals is taken as an edge output. However, when the edge passes the receptive field (receptive region), the ratios of the light receiving areas to the shielded areas become the same for the central portion and the peripheral portion of the receptive field and it becomes impossible to detect the edge, as may be seen from FIGS. 6A through 6C.

FIG. 7 shows the conventional parallel image processing apparatus proposed in the Japanese Published Patent Application No. 50-34901 in more detail. In FIG. 7, those parts which are the same as those corresponding parts in FIGS. 1 through 3 are designated by the same reference numerals.

A parallel image processing apparatus 10 shown in FIG. 7 has an imaging lens 12 which corresponds to a crystalline lens of an eye ball. The photoelectric conversion cell layer 1 is arranged on an optical axis of the imaging lens 12 and corresponds to a retina visual cell. The photoelectric conversion cell layer 1 includes the photoelectric conversion cells 2 which are arranged two-dimensionally in the matrix arrangement. The edge detection cell layer 4 includes the edge detection cells 5 which are arranged two-dimensionally in the matrix arrangement. The edge detection cell 5 has a non-linear characteristic and is coupled to a predetermined number of photoelectric conversion cells 2. A line segment direction detection layer 17 is coupled to the edge detection cell layer 4. The line segment direction detection layer 17 includes a plurality of line segment direction detection cells 18 which are arranged two dimensionally in each direction. For example, the line segment direction detection cell 18 is coupled to a predetermined number of edge detection cells 5 and detects a certain inclination. Such two-dimensional layers are successively coupled to make up a three-dimensional structure.

The edge detection cells 5 of the edge detection cell layer 4 are coupled to the photoelectric conversion cells 2 of the photoelectric conversion cell layer 1 while the line segment direction detection cells 18 of the line segment direction detection cell layer 17 are coupled to the edge detection cells 5 of the edge detection cell layer 4, and the receptive regions of the layers 1, 4 and 17 overlap.

According to the parallel image processing apparatus 10, the imaging lens 12 images a projection image (not shown) of a reading image 19 on the photoelectric conversion cell layer 1. The edge detection cell layer 4 detects the contrast of the projection image based on the output values of the photoelectric conversion cells 2.

As described above, the output signal $U_{ij}^1$ of the edge detection cell 5 is large when the projection image covers the center photoelectric conversion cell 2 and is small when the projection image covers the peripheral photoelectric conversion cells 2. The output signal $U_{ij}^1$ of the edge detection cell 5 in the reception region which is not covered by the projection image or is completely covered by the projection image is zero. FIG. 8 is a diagram showing a relationship between the photoelectric conversion cell layer 1 and the edge detection cell layer 4 together with an output characteristic of the edge detection cells 5 of the edge detection cell layer 4.

The output signals $U_{ij}^1$ of the edge detection cells 5 are supplied to the line segment detection cell layer 17, and each line segment direction detection cell 18 corresponding to the line segment of the projection image detects the inclination of the line segment which is located at a position (x, y) on the photoelectric conversion cell layer 1.

However, according to the parallel image processing apparatus 10, the weighting coefficients are set for the plurality of photoelectric conversion cells which make up one receptive region, so as to obtain the ON centered detection characteristic. For this reason, a weighting circuit comprising a resistor, an inverter and the like is required for each photoelectric conversion cell, and there is a problem in that a large number of circuit elements must be provided with respect to one receptive region. As a result, the circuit structure of the photoelectric conversion cell layer 1 and the edge detection cell layer 4 becomes extremely complex, and the productivity of the parallel image processing apparatus 10 is poor.

SUMMARY OF THE INVENTION

Accordingly, it is a general object of the present invention to provide a novel and useful parallel image processing apparatus in which the problems described above are eliminated.

Another and more specific object of the present invention is to provide a parallel image processing apparatus comprising a photoelectric conversion layer which comprises a plurality of photoelectric conversion elements which are arranged two-dimensionally for receiving an image, and an edge detection layer which comprises a plurality of edge detection elements which are arranged two dimensionally for detecting an edge of the image in response to signals output from the photoelectric conversion elements of the photoelectric conversion layer, where each of the edge detection elements receive a signal E output from a plurality of photoelectric conversion elements in a receptive region and generate an edge information which is a function of a weighted sum of outputs of the plurality of photoelectric conversion elements in the receptive region and the edge information describes the edge of the image. The plurality of photoelectric conversion elements in the receptive region comprise at least a pair of photoelectric conversion elements $A_+$ and $B_+$ which produce a positive output upon receipt of light and a pair of photoelectric conversion elements $A_-$ and $B_-$ which produce a negative output upon receipt of light, and the signal E output from the photo electric conversion elements in the receptive region is described by $E = -|A_+ - A_-| + |B_+ - B_-|$. According to the parallel image processing apparatus of the present invention, it is possible to positively detect the edge of the image.

Still another object of the present invention is to provide a parallel image processing apparatus comprising a photoelectric conversion layer which comprises a plurality of photoelectric conversion elements which are arranged two-dimensionally for receiving an image, a light diffusing member which is arranged at an imaging position on a surface of the photoelectric conversion layer, and an edge detection layer which comprises a plurality of edge detection elements which are arranged two dimensionally for detecting an edge of the image in response to signals output from the photoelectric conversion elements of the photoelectric conversion layer, where each of the edge detection elements receive a signal E output from a plurality of photoelectric conversion elements in a receptive region and generate an edge information which is a function of a weighted sum of outputs of the plurality of photoelectric conversion elements in the receptive region and the edge information describes the edge of the image. The plurality of photoelectric conversion elements in the receptive region comprise at least a pair of photoelectric conversion elements which produces the signal E by differentially amplifying the outputs of the pair of photoelectric conversion elements, and the pair of photoelectric conversion elements is made up of a center element and a peripheral element which surrounds the center element. According to the parallel image processing apparatus of the present invention, the circuit structure and interconnection become simple, and it is possible to obtain an ON or OFF centered edge detection characteristic with ease.

A further object of the present invention is to provide a parallel image processing apparatus described above which further comprises a light transmission member which is arranged between the light diffusing member and the photoelectric conversion layer, and the light transmission member has a refracting power which is larger at the center element than at the peripheral element.

Another object of the present invention is to provide a parallel image processing apparatus described above wherein the edge detection layer comprises comparing means for comparing the signal E with a plurality of threshold values for determining a kind of the image including a character, a picture, a photograph and a blank. According to the parallel image processing apparatus of the present invention, it is possible to detect the tone of the image and classify the image into the different kinds.

Other objects and further features of the present invention will be apparent from the following detailed description when read in conjunction with the accompanying drawings.

BRIEF DESCRIPTION OF THE DRAWINGS

FIG. 9 shows a structure of a unit receptive region which is used in a first embodiment of a parallel image processing apparatus according to the present invention;

FIGS. 10A and 10B respectively are diagrams for explaining an edge detection operation of the first embodiment when a shield plate moves in a direction x;

FIGS. 11A and 11B respectively are diagrams for explaining the edge detection operation of the first embodiment when the shield plate moves in a direction oblique to the direction x;

FIGS. 12A, 12B and 12C respectively show structures of the unit receptive region which is used in first, second and third modifications of the first embodiment;

FIG. 42 is a diagram showing an essential part of an eleventh embodiment of the parallel image processing apparatus according to the present invention; and FIGS. 43 and 44 respectively are diagrams for explaining a twelfth embodiment of the parallel image processing apparatus according to the present invention.

DESCRIPTION OF THE PREFERRED EMBODIMENTS

Figure 3:
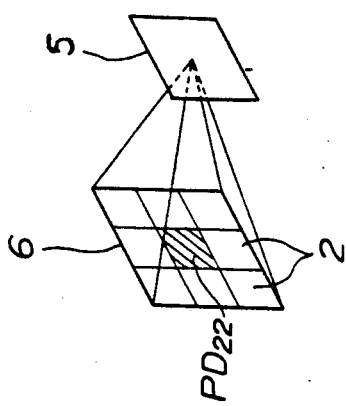
FIG. 3 is a perspective view showing a unit receptive region shown in FIG. 2 on an enlarged scale.
Figure 2:
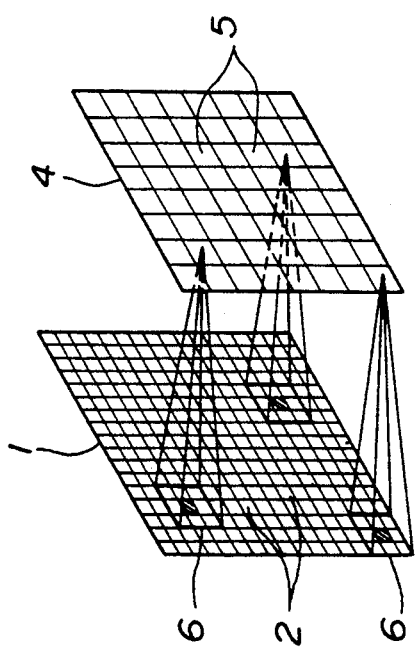
FIG. 2 is a perspective view for explaining the operating principle of an edge detection cell layer.
Figure 1:
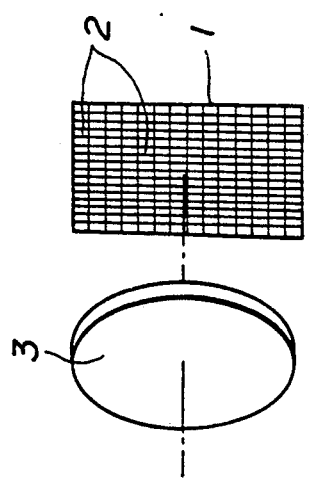
FIG. 1 is a perspective view for explaining the operating principle of a conventional photoelectric conversion cell layer.
Figure 4:
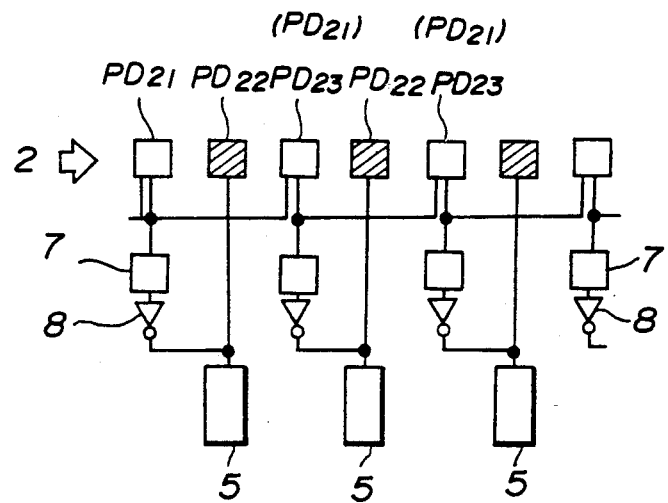
FIG. 4 is a system block diagram for explaining a processing in conformance with the ON centered receptive field system.
Figure 5A:
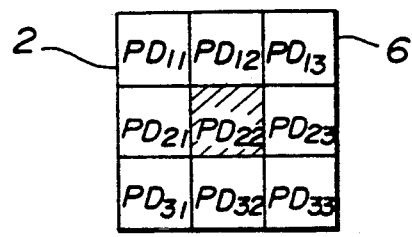
FIGS. 5A and 5B respectively are diagrams for explaining the ON centered receptive field system.
Figure 5B:
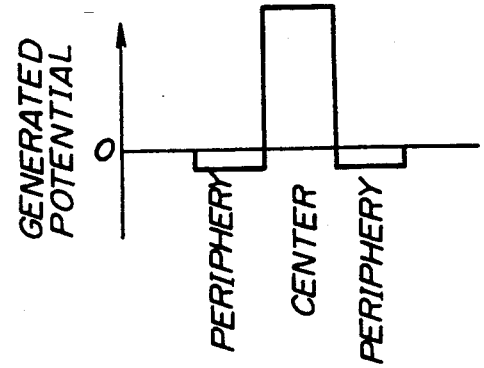
Figure 6A:
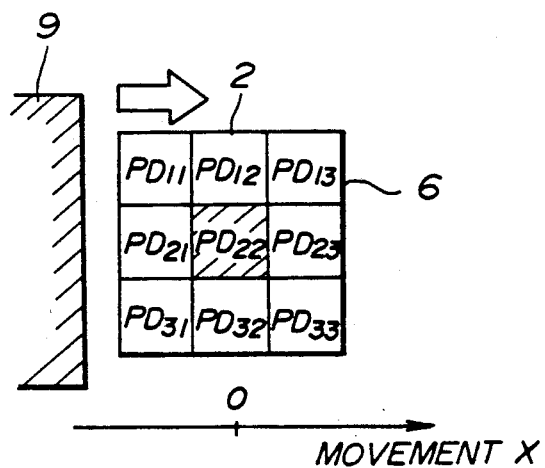
FIGS. 6A, 6B and 6C respectively are diagrams for explaining an edge detection capability of an edge detection cell.
Figure 6B:
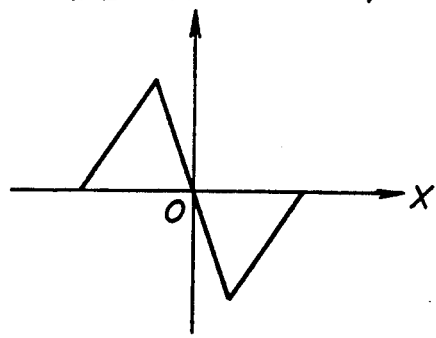
Figure 6C:
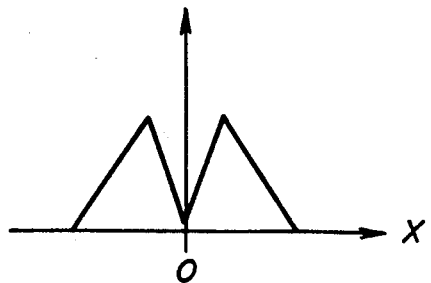

A description will be given of a first embodiment of a parallel image processing apparatus according to the present invention, by referring to FIGS. 9 through 11. This embodiment is based on the edge detection cell system described above. In FIGS. 9 through 11, those parts which are basically the same as those corresponding parts in FIGS. 1 through 8 are designated by the same reference numerals.

In this embodiment, a unit receptive region 23 which is made up of a plurality of photoelectric conversion cells 2 are assigned to each edge detection cell 5. In FIG. 9, for example, the unit receptive region 23 is made up of four photoelectric conversion cells $A_+$, $A_-$, $B_{30}$ and $B_-$, and this unit receptive region 23 is assigned to each edge detection cell 5. As shown in FIG. 9, the four photoelectric conversion cells $A_+$, $A_-$, $B_+$ and $B_-$ are arranged in a rectangular arrangement. The photoelectric conversion cells $A_+$ and $A_-$ are arranged diagonally within the rectangular arrangement and forms a pair A. Similarly, the photoelectric conversion cells $B_+$ and $B_-$ are arranged diagonally within the rectangular arrangement and forms a pair B. The photoelectric conversion cells $A_+$ and $B_+$ produces a positive output upon receipt of light, while the photoelectric conversion cells $A_-$ and $B_-$ produces a negative output upon receipt of light. Hence, the two pairs A and B both include a region which produces a positive output and a region which produces a negative output.

In the unit receptive region 23, the pair A outputs a signal which is an absolute value of a sum of the signals output from the photoelectric conversion cells $A_+$ and $A_-$. Similarly, the pair B outputs a signal which is an absolute value of a sum of the signals output from the photoelectric conversion cells $B_+$ and $B_-$. An input edge signal E to the edge detection cell 5 which corresponds to the unit receptive region 23 is defined in the following manner as a sum total of the output signals of the two pairs A and B.

$$E = |A_+ - A_-| + |B_+ - B_-|$$

Hence, when the shield plate (edge) 9 moves in the direction x from the left to right as shown in FIG. 10A, the edge signal E becomes as shown in FIG. 10B. As may be seen from FIG. 10B, there is no intermediate point where E=0 such that it is impossible to detect the edge, and the edge detection can be carried out positively. The same holds true for the cases where the shield plate 9 is moved from the right to left, from the top to bottom, and from the bottom to top.

In addition, even when the shield plate 9 traverses the unit receptive region 23 in a direction oblique to the direction x as shown in FIG. 11A, it is possible to positively detect the edge without generating a point where it is impossible to detect the edge. In this case, however, the intensity (sensitivity) of the edge signal E decreases as shown in FIG. 11B when compared to the edge signal E shown in FIG. 10B. But by positively using the fact that the sensitivity of the edge signal E is dependent on the edge moving direction, it is possible to give a moving direction selectivity to the sensitivity.

FIGS. 12A, 12B and 12C respectively show first, second and third modifications of the structure of the unit receptive region 23 used in the first embodiment.

In FIG. 12A, the four photoelectric conversion cells $A1_+$, $A1_-$, $B1_+$ and $B1_-$ are spaced apart from each other. In FIG. 12B, the four photoelectric conversion cells $A2_+$, $A2_-$, $B2_+$ and $B2_-$ are arranged in the form of a cross. In these modifications, there is no point where it is possible to detect the edge, and the sensitivity includes direction selectivity. Between the two modifications shown in FIGS. 12A and 12B, the directions related to the sensitivity differ by 45°.

In FIG. 12C, the photoelectric conversion cells are arranged so that the direction selectivity of the sensitivity is suppressed. In other words, in this modification, the pattern shown in FIG. 12A and the pattern shown in FIG. 12B are combined. As a result, the different sensitivities with respect to the direction are cancelled. The edge signal E in this case can be described by the following.

$$E = |A1_+ - A1_-| + |B1_+ - B1_-|$$
$$+ |A2_+ - A2_-| + |B2_+ - B2_-|$$

Therefore, according to this first embodiment and modifications thereof, it is possible to positively detect the edge without generating a point where it is impossible to detect the edge.

Next, a description will be given of a second embodiment of the parallel image processing apparatus according to the present invention, by referring to FIGS. 13 through 19. In FIGS. 13, 14 and 16 through 18, those parts which are basically the same as those corresponding parts in FIG. 7 are designated by the same reference numerals.

Figure 13:
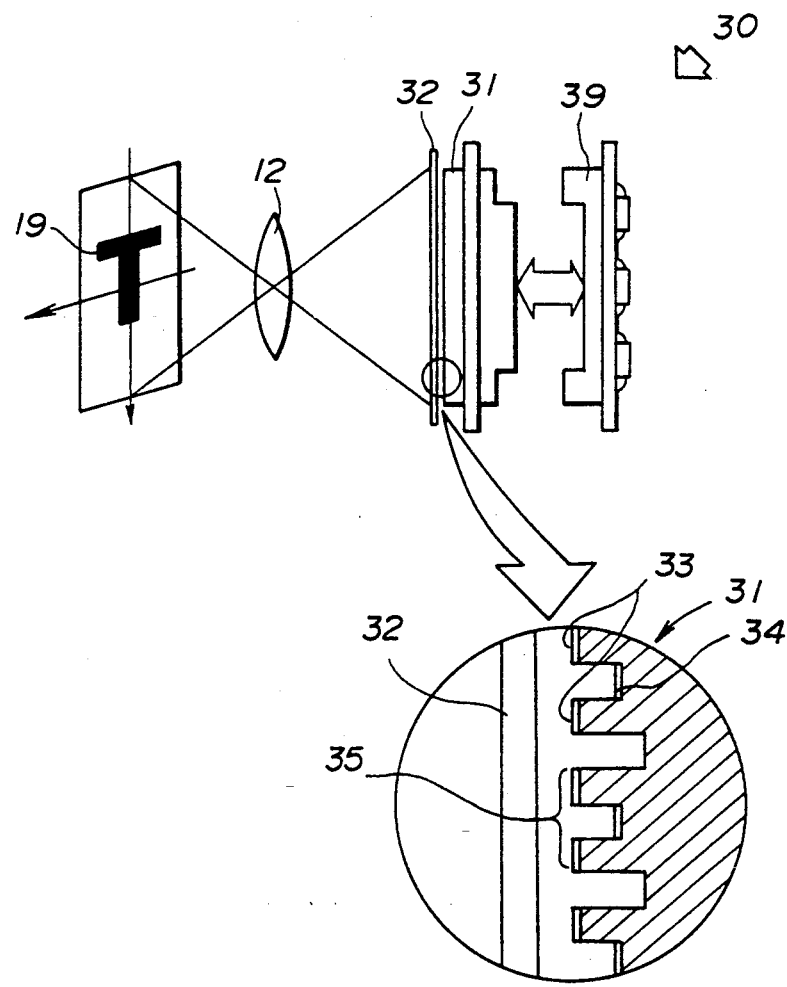
FIG. 13 is a side view generally showing a second embodiment of the parallel image processing apparatus according to the present invention.
Figure 14:
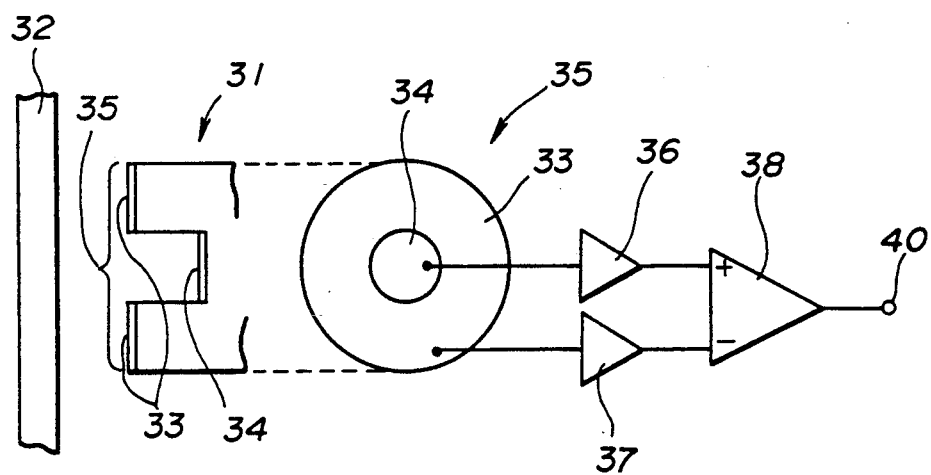
FIG. 14 is a diagram for explaining photoelectric conversion cells of the second embodiment.

In this embodiment, a parallel image processing apparatus 30 has a light diffusing member 32 arranged between the imaging lens 12 and a photoelectric conversion cell layer 31. The photoelectric conversion cell layer 31 includes a plurality of photoelectric conversion cell pairs 35 which are arranged two-dimensionally. Each photoelectric conversion cell pair 35 has a photoelectric conversion function and integrally comprises a center cell 34 and a peripheral cell 33 which projects in a ring shape along the direction of the optical axis and surround the center cell 34. Each photoelectric conversion cell pair 35 is coupled to the edge detection cell 5 via amplifiers 36 and 37 and a differential amplifier 38 which are provided with respect to each of the cells 33 and 34 as shown in FIG. 14. As shown in FIG. 13, the photoelectric conversion cell layer 31 and an operation circuit 39 which constitutes the edge detection cell layer can be coupled with ease because the photoelectric conversion cell layer 31 and the operation circuit 39 are respectively formed as a unit.

Figure 7:
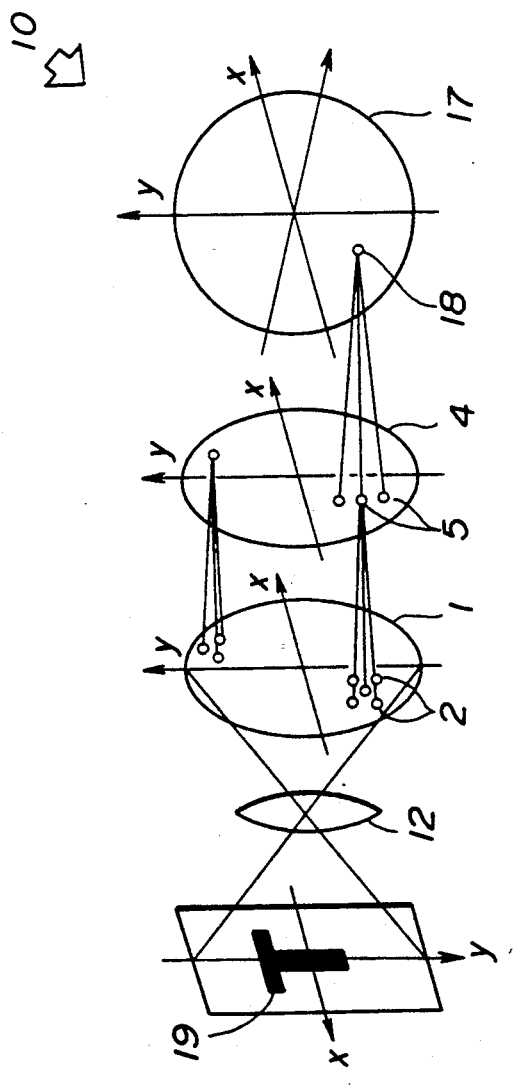
FIG. 7 is a diagram for explaining the conventional parallel image processing apparatus in more detail.
Figure 8:
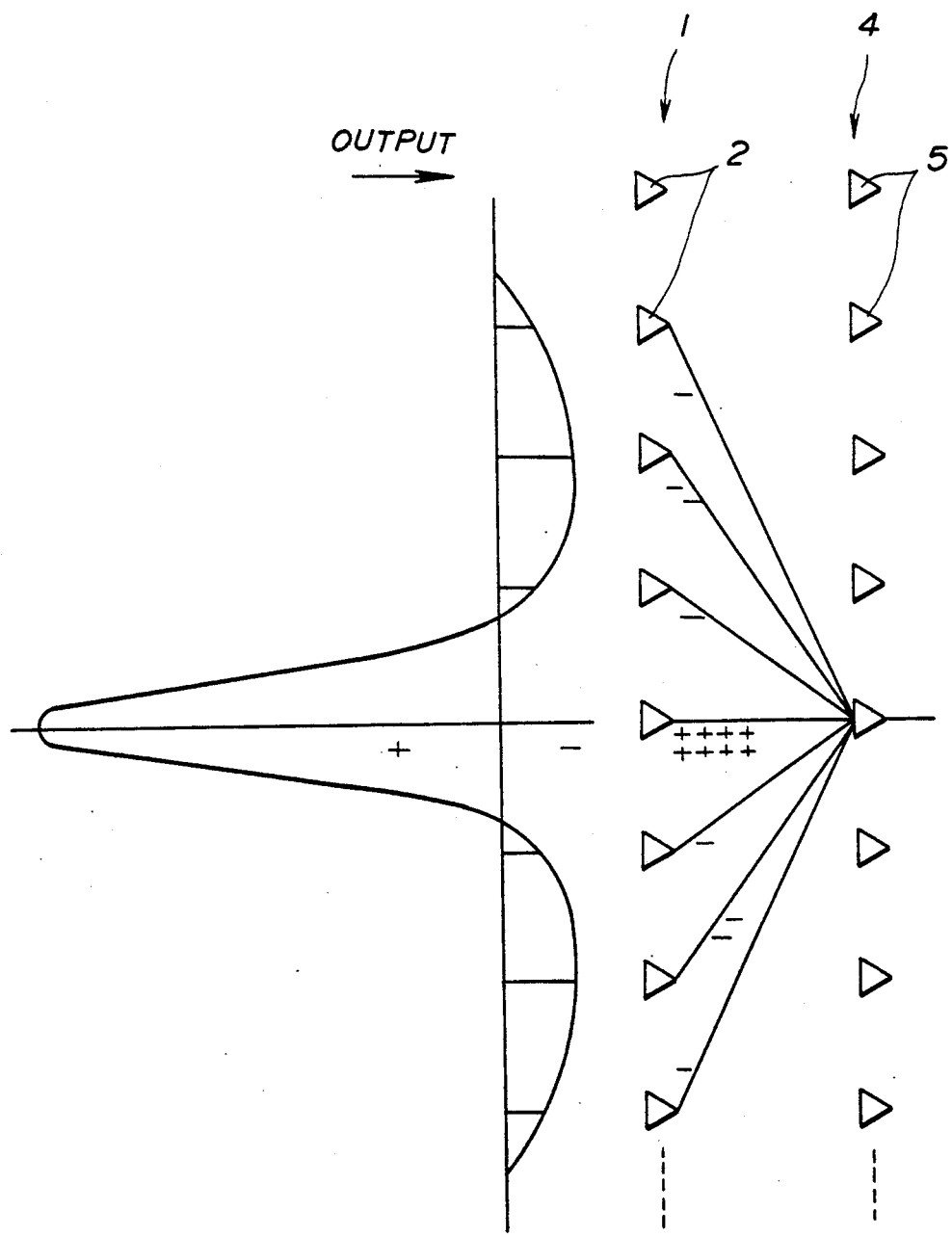
FIG. 8 is a diagram showing a relationship between a photoelectric conversion cell layer and an edge detection cell layer together with an output characteristic of edge detection cells of the edge detection cell layer.
Figure 15A:
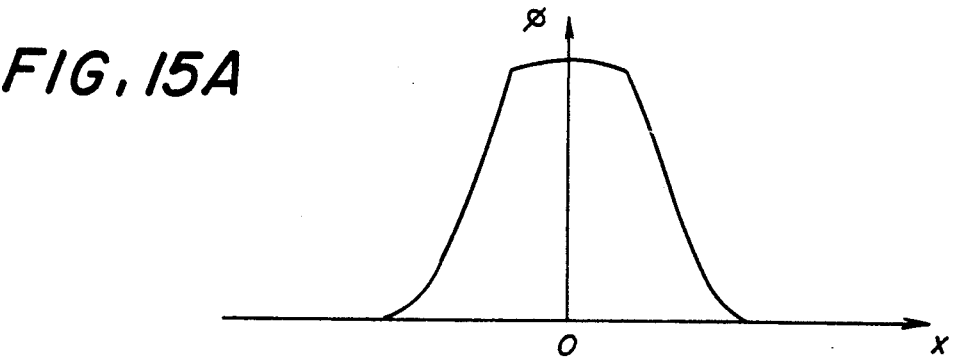
FIG. 15A shows an output characteristic of a center cell in the second embodiment.
Figure 15B:
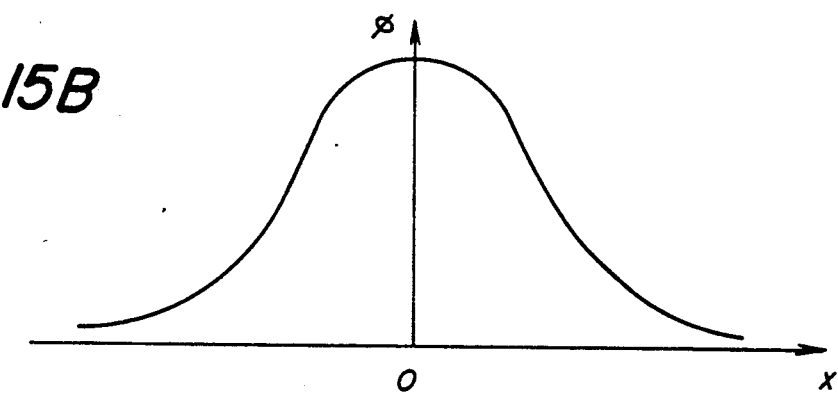
FIG. 15B shows an output characteristic of a peripheral cell in the second embodiment.
Figure 15C:
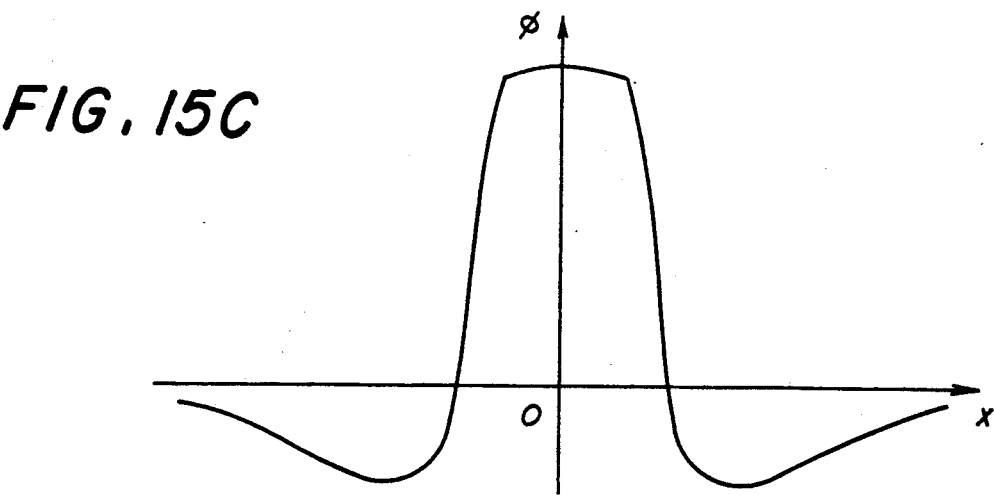
FIG. 15C shows an output characteristic which corresponds to a detection value which is supplied from the photoelectric conversion cell pair to the edge detection cell in the second embodiment.
Figure 16:
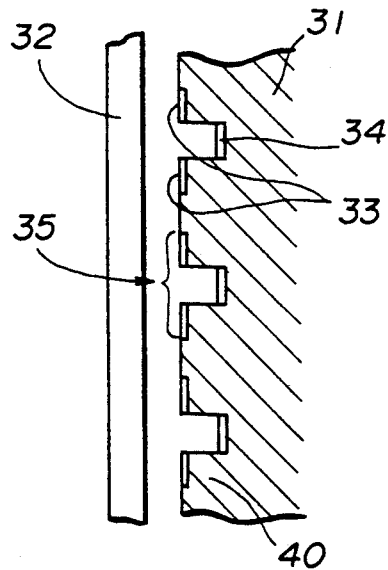
FIG. 16 is a side view generally showing a modification of a photoelectric conversion cell layer.

The parallel image processing apparatus 30 functions similarly to the parallel image processing apparatus 10 shown in FIG. 7. However, in the parallel image processing apparatus 30, the center cell 34 of the photoelectric conversion cell pair 35 is surrounded by the peripheral cell 33, and the light diffusing member 32 is arranged on the optical path. For this reason, when a light spot moves on the light diffusing member 32, an output of the center cell 34 is large when the light spot is positioned approximately at the center of the photoelectric conversion cell pair 35 and rapidly decreases away from this position as shown in FIG. 15A. The output of the center cell 34 becomes as shown in FIG. 15A because the diffused light reaching the center cell 34 is blocked by the peripheral cell 35 which projects in the ring shape when the incident angle of the diffused light to the center cell 34 becomes large. On the other hand, when the light spot moves on the light diffusing member 32, an output of the peripheral cell 33 is a maximum when the light spot is positioned approximately at the center of the photoelectric conversion cell pair 35 and gradually decreases away from this position as shown in FIG. 15B. Hence, in the parallel image processing apparatus 30, the outputs of the cells 33 and 34 having the characteristics shown in FIGS. 15B and 15A are amplified in the respective amplifiers 37 and 36 with a predetermined amplification ratio, and the differential amplifier 38 obtains a difference between the outputs of the amplifiers 36 and 37. An output of the differential amplifier 38 is obtained via a terminal 40. As a result, it is possible to easily obtain the ON centered output characteristic shown in FIG. 15C.

According to this embodiment, each photoelectric conversion cell pair 35 has a dual circular structure having the center cell 34 and the peripheral cell 33 which surrounds the center cell 34 and project in the ring shape. For this reason, the number of interconnections from the photoelectric conversion cell pairs 35 to the corresponding edge detection cells of the operation circuit 39 (edge detection cell layer) is extremely small and the productivity of the parallel image processing apparatus 30 is improved. In addition, in the parallel image processing apparatus 30, the light diffusing member 32 which diffuses the projection image of the reading image 19 is arranged on the optical path which leads to the photoelectric conversion cell layer 31. But the photoelectric conversion cell layer 31 can be made freely slidable in the direction of the optical axis, for example, so that the region of the projection image on the photoelectric conversion cell layer 31 is adjustable. In this case, the detection range of the photoelectric conversion cell pair 35 can be enlarged or reduced, and it is possible to modify the size of the receptive region of the photoelectric conversion cell layer 31.

Although the photoelectric conversion cell pair 35 of this embodiment integrally comprises the center cell 14 and the peripheral cell 13, the structure of the photoelectric conversion cell pair 35 is not limited to such. For example, the peripheral cells 33 and the embedded center cells 34 can be formed continuously on a substrate 40 as in a modification shown FIG. 16. In this case, it is possible to form the cells 33 and 34 with a uniform characteristic and a uniform arrangement, thereby making it possible to produce parallel image processing apparatuses having a stable performance with a high productivity.

Figure 17:
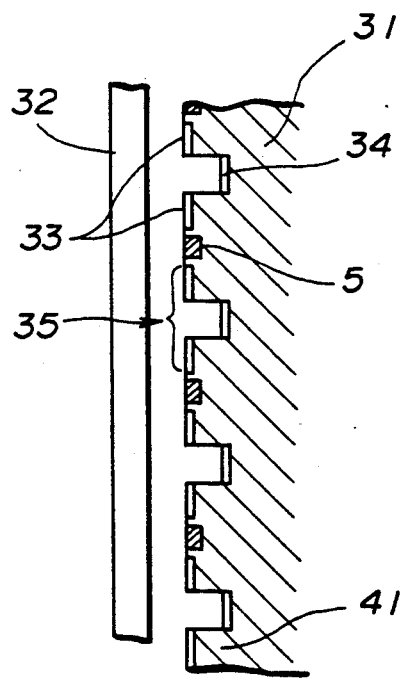
FIG. 17 is a side view generally showing another modification of the photoelectric conversion cell layer.

As in another modification shown in FIG. 17, the cells 33 and 34 and the edge detection cells 5 may be formed on a single substrate 41. In this case, it is possible to further improve the productivity of the parallel image processing apparatus.

Figure 18:
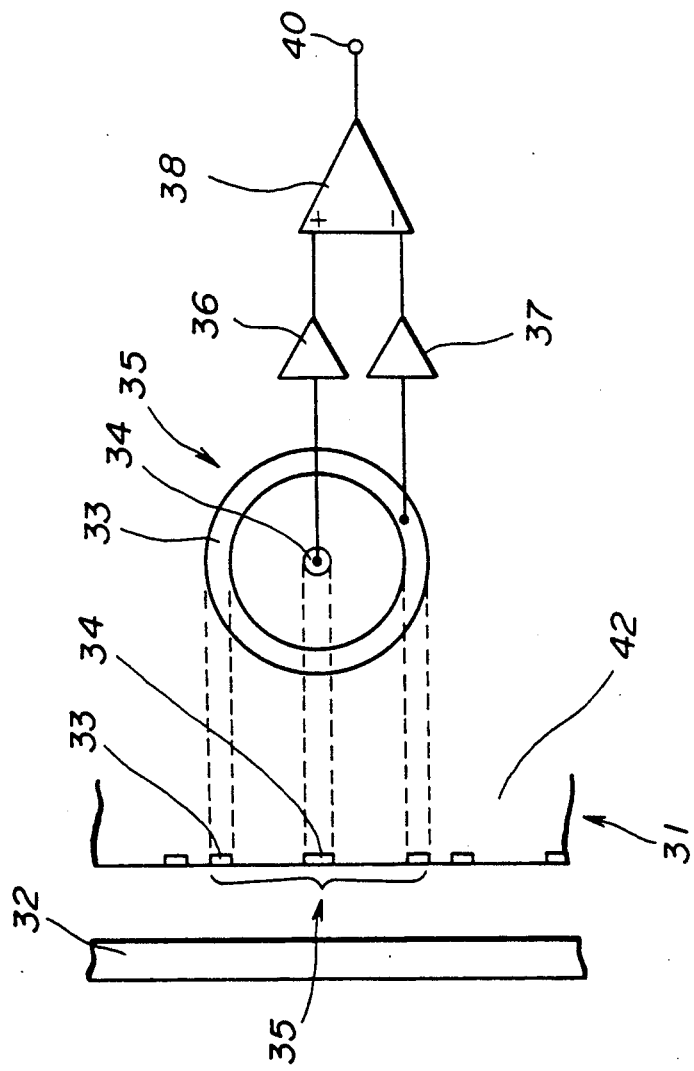
FIG. 18 is a diagram for explaining photoelectric conversion cells of a modification of the second embodiment.
Figure 19A:
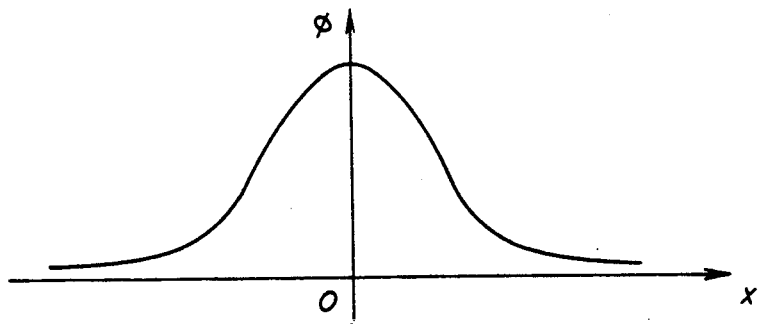
FIG. 19A shows an output characteristic of a center cell in the modification of the second embodiment.
Figure 19B:
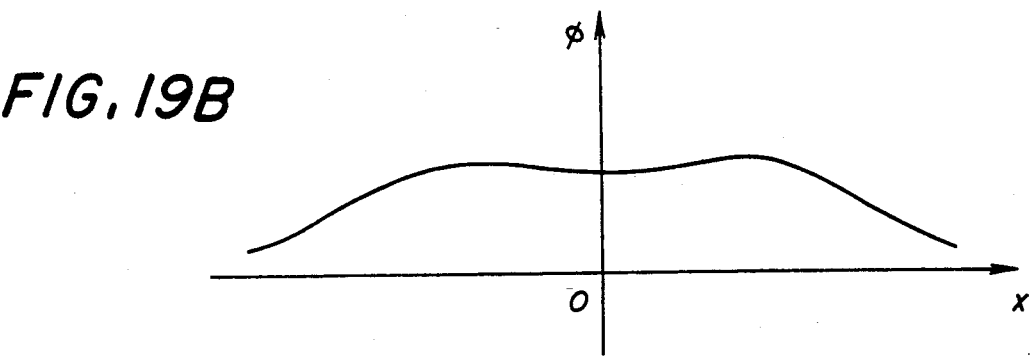
FIG. 19B shows an output characteristic of a peripheral cell in the modification of the second embodiment.
Figure 19C:
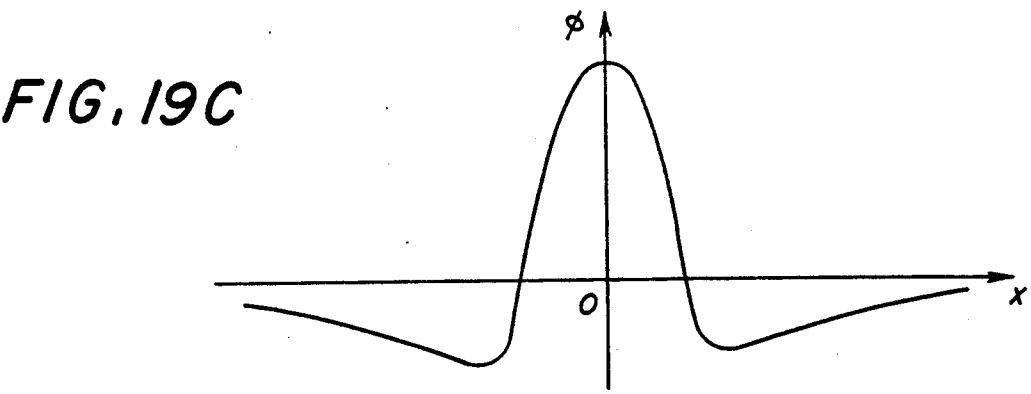
FIG. 19C shows an output characteristic which corresponds to a detection value which is supplied from the photoelectric conversion cell pair to the edge detection cell in the modification of the second embodiment.

FIG. 18 shows a modification of the second embodiment. In this modification, the cells 33 and 34 are formed on a single substrate 42 so that the cells 33 and 34 are located on the same plane. In this case, the receptive region on the photoelectric conversion cell layer 31 can be set depending on the arrangement of the cells 33 and 34. Further, the center cell 34 has an output characteristic shown in FIG. 19A and the peripheral cell 33 has an output characteristic shown in FIG. 19B which are mutually different. As described above, the outputs of the cells 33 and 34 are amplified in the respective amplifiers 37 and 36 with the predetermined amplification ratio, and the differential amplifier 38 obtains the difference between the outputs of the amplifiers 36 and 37. The output of the differential amplifier 38 is obtained via the terminal 40. As a result, it is possible to easily obtain an ON centered output characteristic shown in FIG. 19C.

Therefore, according to this second embodiment and the modification thereof, it is possible to obtain a crosstalk region between the photoelectric conversion cell pairs, and the receptive region on the photoelectric conversion cell layer is large for the peripheral cells when compared to the center cells. In addition, the ON centered or OFF centered detection characteristic can be easily derived from the outputs of the center and peripheral cells of the photoelectric conversion cell layer. The circuit structure is simple and productivity of the parallel image processing apparatus is high because there is no need to provide a weighting circuit for each photoelectric conversion cell. Moreover, the required interconnections are simple since the photoelectric conversion cell pair is made up of the center cell and the peripheral cell and has a simple structure.

Figure 20:
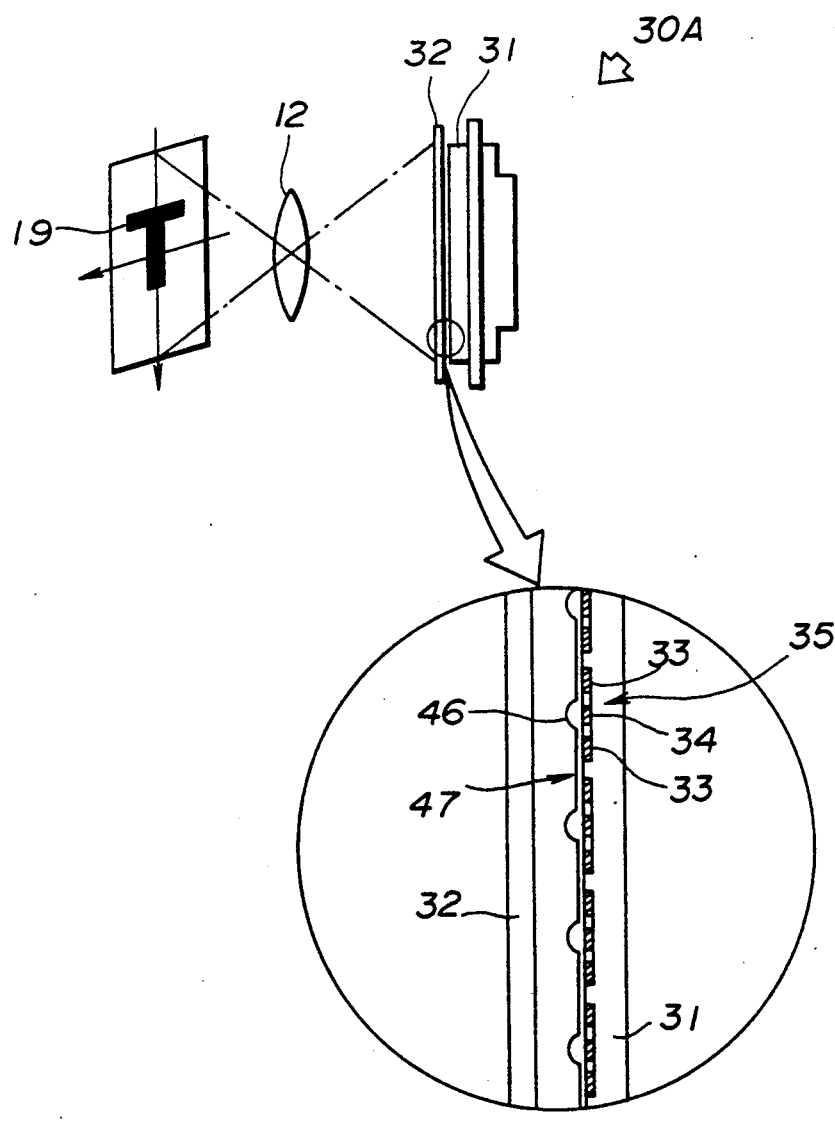
FIG. 20 is a side view generally showing a third embodiment of the parallel image processing apparatus according to the present invention.
Figure 21:
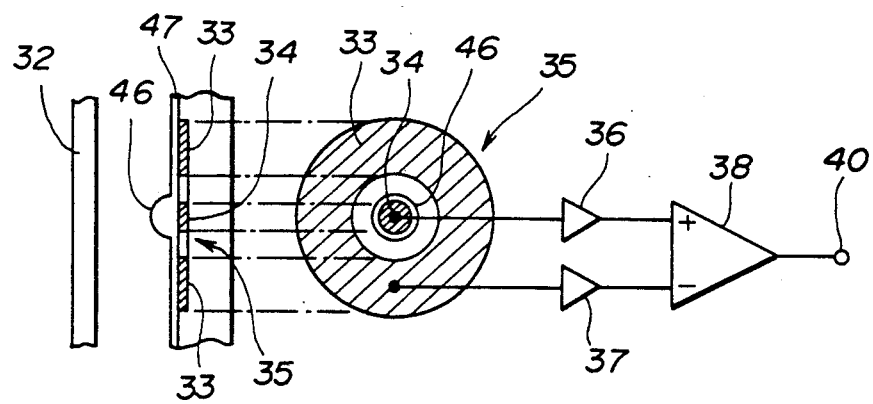
FIG. 21 is a diagram for explaining photoelectric conversion cells of the third embodiment.

Next, a description will be given of a third embodiment of the parallel image processing apparatus according to the present invention, by referring to FIGS. 20 through 22. In FIGS. 20 and 21, those parts which are basically the same as those corresponding parts in FIGS. 13 and 14 are designated by the same reference numerals, and a description thereof will be omitted.

In this embodiment, a light transmission member 47 of a parallel image processing apparatus 30A is provided on a surface of the photoelectric conversion cell layer 31 so that the light transmission member 47 is interposed between the light diffusing member 32 and the photoelectric conversion cell layer 31. The light transmission member 47 has a plurality of convex lenses 46, and each convex lens 46 is formed in front of a corresponding center cell 34.

The parallel image processing apparatus 30A extracts the edge information of the reading image 19 similarly to the parallel image processing apparatus 30. However, because the convex lens 46 is only formed in front of the center cell 34 of the photoelectric conversion cell pair 35, the projection light of the reading image 19 which is imaged on the light diffusing member 32 and diffused is converged by the convex lens 46, while the projection light at parts other than the convex lens 46 is transmitted through the light transmission member 47 and is received by the peripheral cell 33. In other words, the directivity characteristic of each photoelectric conversion cell pair 35 with respect to the incident light is such that the directivity of the center cell 34 is higher than that of the peripheral cell 33.

Figure 22A:
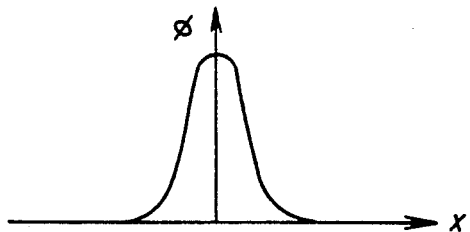
FIG. 22A shows an output characteristic of a center cell in the third embodiment.
Figure 22B:
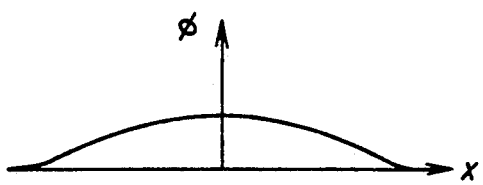
FIG. 22B shows an output characteristic of a peripheral cell in the third embodiment.
Figure 22C:
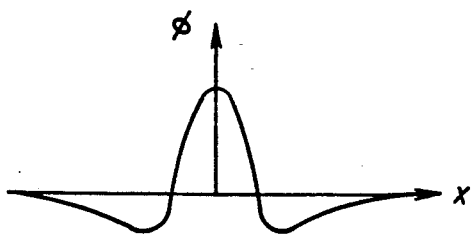
FIG. 22C shows an output characteristic which corresponds to a detection value which is supplied from the photoelectric conversion cell pair to the edge detection cell in the third embodiment.

Next, a description will be given of the detectivity characteristic of each photoelectric conversion cell pair 35 when a light spot moves on the light diffusing member 32. First, as shown in FIG. 22A, the output of the center cell 34 is large when the light spot is positioned approximately at the center of the photoelectric conversion cell pair 35 and rapidly decreases away from this position. On the other hand, as shown in FIG. 22B, the output of the peripheral cell 33 is a maximum when the light spot is positioned approximately at the center of the photoelectric conversion cell pair 35 and gradually decreases away from this position.

The outputs of the cells 33 and 34 are amplified in the respective amplifiers 37 and 36 with the predetermined amplification ratio, and the differential amplifier 38 obtains the difference between the outputs of the amplifiers 36 and 37. The output of the differential amplifier 38 is obtained via the terminal 40. As a result, it is possible to easily obtain an ON centered detection characteristic shown in FIG. 22C.

In this embodiment, the light transmission member 47 is fixed to the surface of the photoelectric conversion cell layer 31. However, other arrangements may be used as long as the refracting power with respect to the incident light is larger at the center cell 34 than at the peripheral cell 33 so that the directivity of the center cell 34 is high compared to that of the peripheral cell 33. In other words, independent convex lenses may be mounted on the corresponding center cells 34. It is also possible to mount independent concave lenses on the corresponding peripheral cells 33. As another alternative, a light transmission member having convex and concave lenses may be mounted on the photoelectric conversion cell layer 31 so that each convex lens is provided in front of the corresponding center cell 34 and each concave lens is provided in front of the corresponding peripheral cell 33. In addition, a light transmission member which has the form of a convex lens such that the refracting power is larger at the center cell 34 compared to the peripheral cell 33 may be provided independently with respect to each photoelectric conversion cell pair 35. Moreover, a light transmission member which has the form of a concave lens such that the refracting power is larger at the peripheral cell 33 compared to the center cell 34 may be provided independently with respect to each photoelectric conversion cell pair 35.

Similarly as in the case of the second embodiment, each photoelectric conversion cell pair 35 is made up of the center cell 34 and the peripheral cell 33 which surrounds the center cell 34. For this reason, the number of interconnections from the photoelectric conversion cell pairs 35 to the corresponding edge detection cells of the operation circuit 39 (edge detection cell layer) is extremely small and the productivity of the parallel image processing apparatus 30A is improved. In addition, in the parallel image processing apparatus 30A, the light diffusing member 32 which diffuses the projection image of the reading image 19 is arranged on the optical path which leads to the photoelectric conversion cell layer 31. But the photoelectric conversion cell layer 31 can be made freely slidable in the direction of the optical axis, for example, so that the region of the projection image on the photoelectric conversion cell layer 31 is adjustable. In this case, the detection range of the photoelectric conversion cell pair 35 can be enlarged or reduced, and it is possible to modify the size of the receptive region of the photoelectric conversion cell layer 31. Furthermore, the cells 33, 34 and 5 may be formed on a single substrate similarly to the modification of the second embodiment. In this case, the productivity of the parallel image processing apparatus 30A can be improved further.

Figure 23:
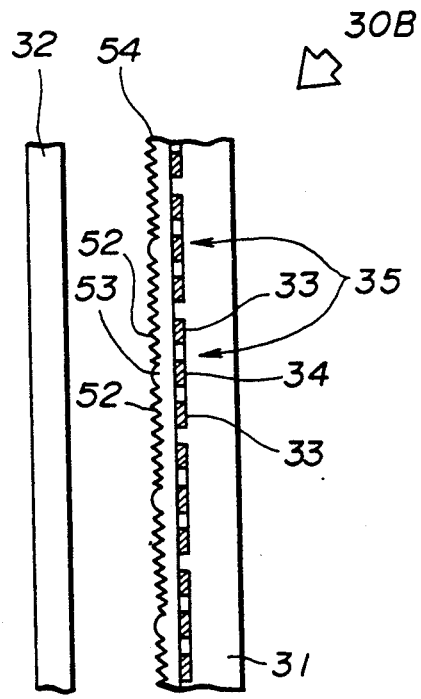
FIG. 23 is a side view generally showing a fourth embodiment of the parallel image processing apparatus according to the present invention.
Figure 24:
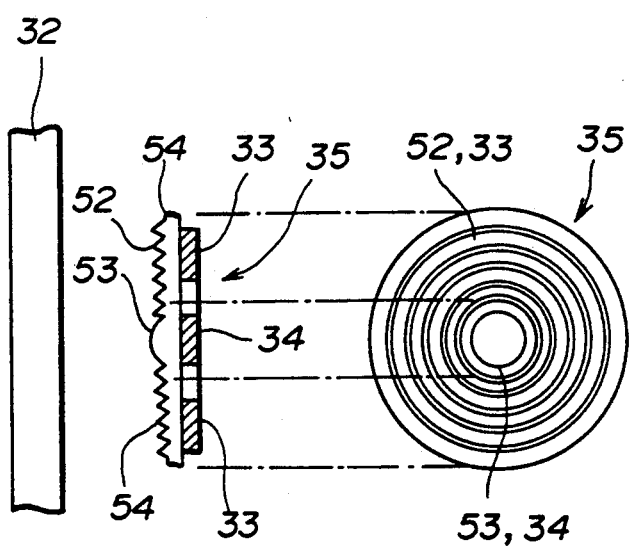
FIG. 24 is a diagram for explaining photoelectric conversion cells of the fourth embodiment.

Next, a description will be given of a fourth embodiment of the parallel image processing apparatus according to the present invention, by referring to FIGS. 23 and 24. In FIGS. 23 and 24, those parts which are basically the same as those corresponding parts in FIGS. 20 and 21 are designated by the same reference numerals, and a description thereof will be omitted.

In this embodiment, a parallel image processing apparatus 30B has a light transmission member 54 which is provided on the surface of the photoelectric conversion cell layer 31, and this light transmission member 54 is made up of a Fresnel lens which has a large refracting power at a front portion 43 which confronts the center cell 34 when compared to the refracting power at a front portion 42 which confronts the peripheral cell 33.

The projection light of the reading image 19 which is imaged on the light diffusing member 32 and diffused is strongly converged at the front portion 53 and received by the center cell 34. On the other hand, the projection light is weakly converged at the front portion 52 and received by the peripheral cell 33. Similarly as in the case of the third embodiment, the edge information of the reading image 19 is extracted using the ON centered detection characteristic.

According to this embodiment, it is possible to set a large difference in the directivities between the peripheral cell 33 and the center cell 34 without increasing the thickness of the parallel image processing apparatus 30B in the vicinity of the light transmission member 54 and the photoelectric conversion cell layer 31, because the light transmission member 54 is made of the Fresnel lens.

Figure 25:
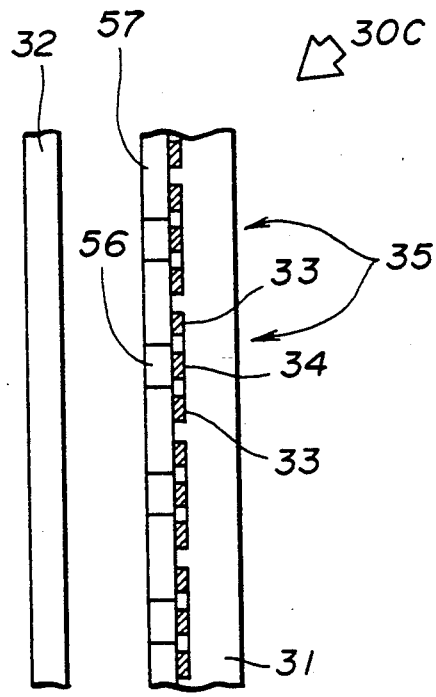
FIG. 25 is a side view generally showing a fifth embodiment of the parallel image processing apparatus according to the present invention.
Figure 26:
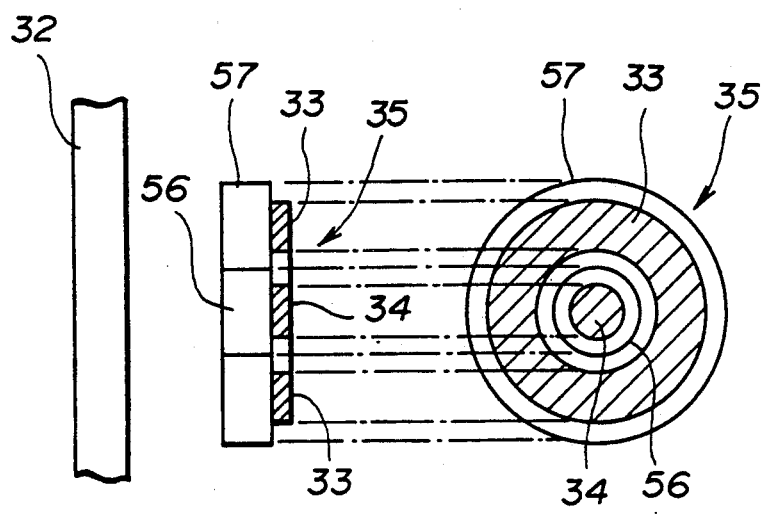
FIG. 26 is a diagram for explaining photoelectric conversion cells of the fifth embodiment.

Next, a description will be given of a fifth embodiment of the parallel image processing apparatus according to the present invention, by referring to FIGS. 25 and 26. In FIGS. 25 and 26, those parts which are basically the same as those corresponding parts in FIGS. 20 and 21 are designated by the same reference numerals, and a description thereof will be omitted.

In this embodiment, a parallel image processing apparatus 30C has a light transmission member 57 which is provided on the surface of the photoelectric conversion cell layer 31, and this light transmission member 57 has a distributed index lens 56 formed to confront each corresponding center cell 34.

According to this embodiment, the projection light of the reading image 19 which is imaged on the light diffusing member 32 and diffused is converged by the distributed index lens 56 and received by the center cell 34. The projection light is transmitted through the light transmission member 57 at parts other than the distributed index lens 56 and received by the peripheral cell 33. The edge information of the reading image 19 is extracted similarly to the parallel image processing apparatuses 30A and 30B.

In a copying machine or the like, the tone of the copied (printed) image is adjusted depending on the tone of the original document image. When characters, picture (graphic) and photograph coexist in the document image, the tone of the copied image is set with reference to one of the character, picture and photograph.

When the tone of the copied image is adjusted with reference to the character, for example, the gradation of the copied image becomes large and the picture quality is improved for the character. However, the picture quality of the photograph becomes deteriorated in this case because the picture quality of the photograph is improved by emphasizing the halftone. On the other hand, when the tone of the copied image is adjusted with reference to the photograph, the picture quality of the photograph is improved for the photograph, but a blur or the like is generated for the character and it is impossible to obtain clear and sharp image for the character.

Accordingly, a description will now be given of embodiments of the parallel image processing apparatus according to the present invention in which the above described problems are eliminated.

Figure 27:
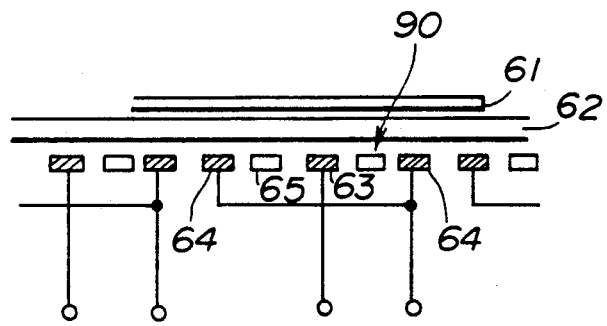
FIGS. 27, 28 and 29 respectively are diagrams showing essential parts of a sixth embodiment of the parallel image processing apparatus according to the present invention.
Figure 28:
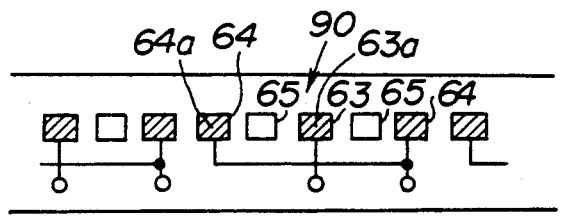
Figure 29:
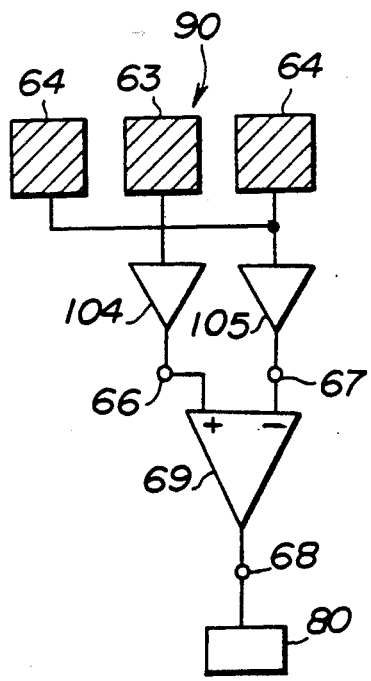

FIGS. 27 through 29 show essential parts of a sixth embodiment of the parallel image processing apparatus according to the present invention. In this embodiment and the embodiments described hereafter, it is assumed for the sake of convenience that the parallel image processing apparatus is used in a copying machine.

In FIG. 27, a document 61 which is to be copied includes a character portion, a picture portion, a photograph portion and a blank portion. The document 61 is placed on a protection glass 62. As shown, a plurality of light receiving element pairs 90 which are arranged one-dimensionally. Each light receiving element pair 90 comprises a center element 63 and a pair of peripheral elements 64 which sandwich the center element 63. The elements 63 and 64 are photoelectric conversion elements or cells. As shown in FIG. 28, a light receiving part 63a of the center element 63 and a light receiving part 64a of the peripheral element 64 both have a rectangular shape. A light source 65 emits a light for irradiating the document 61 on the protection glass 62, and this light source 65 is arranged between the center element 63 and the peripheral element 64.

As shown in FIG. 29, the center element 63 is connected to a weighting circuit 104 and the two peripheral elements 64 are connected to the weighting circuit 105. The weighting circuit 104 is coupled to a differential circuit 69 via an output terminal 66, while the weighting circuit 105 is coupled to the differential circuit 69 via an output terminal 67. An output of the differential circuit 69 is connected to an output terminal 68 which connects to a corresponding threshold element pair 80. A plurality of threshold element pairs 80 are provided in correspondence with the light receiving element pairs 30.

The weighting circuits 104 and 105, the differential circuit 69 and the output terminal 68 constitute a differential means. On the other hand, the threshold element pair 20 constitutes a comparing and outputting means.

The weighting circuits 104 and 105 function so that a ratio of the outputs at the output terminals 66 and 67 is 1:1 when a uniform light is irradiated on the entire light receiving part 63a of the center element 63 and on the entire light receiving part 64a of each of the two peripheral elements 64. The output at the output terminal 66 is applied to a non-inverting input terminal of the differential circuit 69, while the output at the output terminal 67 is applied to an inverting input terminal of the differential circuit 69. The differential circuit 69 compares the non-inverted output of the weighting circuit 104 and the inverted output of the weighting circuit 105 and outputs a signal which is dependent on the difference between the two outputs. The output signal of the differential circuit 69 is obtained via the output terminal 68.

Threshold values Tha and Thb are set in the threshold element pair 80 as reference values. The threshold values Tha and Thb will be described later in the specification.

Figure 30A:
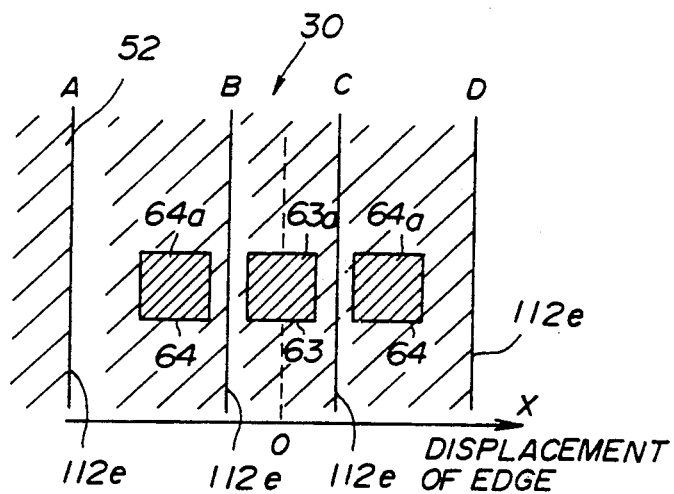
FIGS. 30A and 30B respectively ar diagrams for explaining an edge detection operation of the sixth embodiment.
Figure 30B:
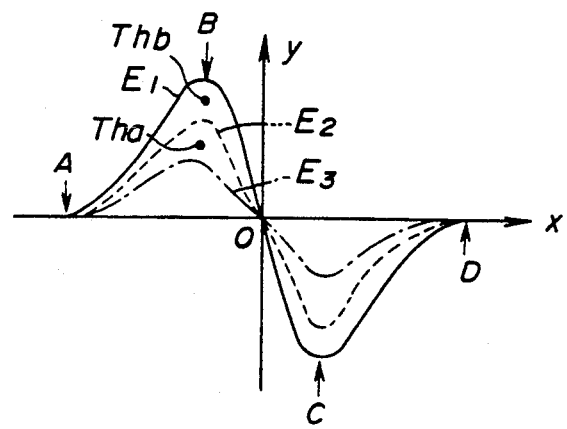

Next, a description will be given of the edge extraction operation of this embodiment with respect to the character part of the document 61. The light source 65 emits the light which irradiates the document 61 on the protection glass 62, and the light receiving element pair 90 detects the reflected light from the document 61. FIG. 30A shows a positional relationship of edges 112e of a character part 112 with respect to the light receiving element pair 90. FIG. 30B is a graph showing an edge output which is obtained from the output terminal 68 in correspondence with FIG. 30A. In FIG. 30B, the x-axis indicates the displacement of the edge of the character part 112 and the y-axis indicates the magnitude of the edge output. In addition, a curve indicated by a solid line in FIG. 30B shows the state of the edge output from the output terminal 68 when the edge of the character part 112 is detected.

Next, a description will be given of the edge detection operation for the character part 112 of the document 61. When the edge 112e of the character part 112 is located at a point A in FIG. 30A, the light receiving part 63a of the center element 63 and the light receiving parts 64a of the two peripheral elements 64 all receive uniform light. Accordingly, the ratio of the outputs at the output terminals 66 and 67 is 1:1 and no output is obtained at the output terminal 68 as may be seen from FIG. 30B. Hence, it is detected that no edge of the character part exists at the part of the document 61 corresponding to the light receiving element pair 90.

When the edge 112e of the document part 112 is located at a point B in FIG. 30A, the light receiving part 64a of the peripheral element 64 which is positioned on the left side is covered by the character part 112 and the light receiving quantity of this light receiving part 64a decreases. For this reason, the output at the output terminal 66 becomes larger than the output at the output terminal 67, and the ratio of the outputs at the output terminals 66 and 67 no longer satisfies 1:1. As shown in FIG. 30B, a positive edge output E1 which corresponds to the difference between the outputs at the output terminals 66 and 67 is obtained via the output terminal 68 and supplied to the threshold element pair 80.

On the other hand, when the edge 112e of the character part 112 is located at a point C in FIG. 30A, the light receiving part 64a of the peripheral element 64 which is positioned on the left side and the light receiving part 63a of the center element 63 are covered by the character part 112. Thus, the output at the output terminal 67 becomes larger than the output at the output terminal 66. As shown in FIG. 30B, a negative edge output E1 which corresponds to the difference between the outputs at the output terminals 66 and 67 is obtained via the output terminal 68 and supplied to the threshold element pair 80.

When the edge 112e of the character part 112 is located at a point D in FIG. 30A, all the light receiving parts 63a and 64a of the center element 63 and the two peripheral elements 64 are covered by the character part 112. Accordingly, the ratio 1:1 is satisfied between the outputs at the output terminals 66 and 67, and no output is obtained from the output terminal 68 as may be seen from FIG. 30B. This means that no edge of the character part exists at the part of the document 61 corresponding to the light receiving element pair 90.

Next, a description will be given of the edge detection operation of this embodiment with respect to the picture part and the photograph part of the document 61. In FIG. 30B, a curve indicated by a phantom line shows the state of an edge output E2 at the output terminal 68 when the edge of the picture or photograph part is detected similarly to the character part.

The edge output E2 for the picture or photograph part shows the same increase/decrease tendency as the edge output E1 for the character part, but the level of the edge output E2 is low compared to the level of the edge output E1. This low level of the edge output E2 is due to the fact that the contrast of the picture and photograph parts is low compared to the contrast of the character part. In other words, when the case where the edge of the character part is located at the point B in FIG. 30B and the case where the edge of the picture or photograph part is located at the point B are compared, the difference in contrast between the bright and dark portions of the character part is large compared to that of the picture or photograph part. For this reason, the output difference between the center and peripheral elements 63 and 64 is large in the case of the character part. But in the case of the picture or photograph part, the output difference between the center and peripheral elements 63 and 64 is small.

Next, a description will be given of the threshold values Tha and Thb. When the tone is set so that the blank part of the document 61 has the lowest tone, the picture and photograph parts have tone higher than that of the blank part and the character part has the highest tone, the threshold value Tha is used for distinguishing the blank part from the picture or photograph part and the threshold value Thb is used for distinguishing the picture or photograph part from the character part.

As shown in FIG. 30B, the threshold value Tha is set to an intermediate value between a maximum of the output value E2 which is obtained for the picture or photograph part and a maximum of an output value E3 which is obtained for the blank part during the edge detection operation. On the other hand, the threshold value Thb is set to an intermediate value between a maximum of the output value E1 which is obtained for the character part and the maximum of the output value E2 which is obtained for the picture or photograph part during the edge detection operation.

Figure 31:
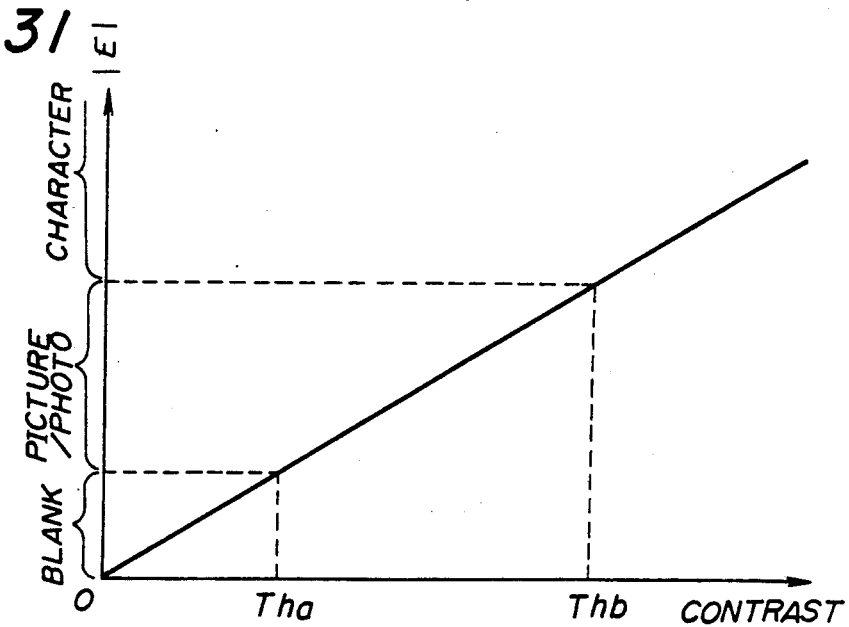
FIG. 31 is a diagram for explaining the operation of the sixth embodiment.

Next, a description will be given of an image classifying operation. The image classification is made by comparing a maximum value of an output value E at the output terminal 68 with the threshold values Tha and Thb in the threshold element pair 80. In other words, when the comparison result obtained for the output value E and the threshold values Tha and Thb is such that $0 < |E| \leq Tha$ as shown in FIG. 31, the detected edge belongs to the blank part. When the comparison result is such that $Tha < |E| \leq Thb$, the detected edge belongs to the picture or photograph part. When the comparison result is such that $Thb < |E|$, the detected edge belongs to the character part.

When the edge of the character part is detected by the image classification operation, a processing (non-halftone process) is carried out so as to describe the character part with a high contrast. On the other hand, when the edge of the picture or photograph part is detected by the image classification operation, the copying tone is adjusted so that the halftone is emphasized. When the edge of the blank part is detected, a non-halftone process or a halftone process is carried out depending on the output of the center element 63. When the output of the center element 63 is large, the blank part is regarded as a background of the character part and the non-halftone process is carried out. On the other hand, when the output of the center element 63 is small, the blank part is regarded as a black blank of the character part and the non-halftone process is carried out. When the output of the center element 63 has an intermediate level, the blank part is regarded as a blank part of the picture or photograph part and the halftone process is carried out.

Figure 32:
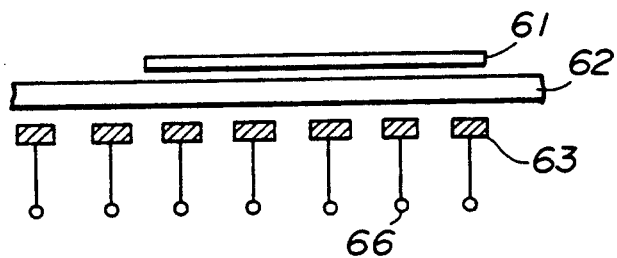
FIGS. 32 and 33 respectively are diagrams showing essential parts of a seventh embodiment of the parallel image processing apparatus according to the present invention.
Figure 33:
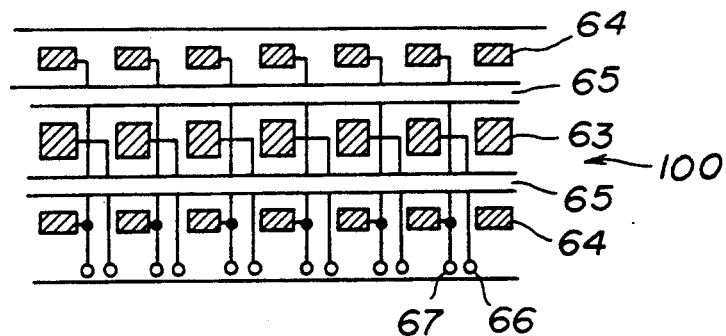

Next, a description will be given of a seventh embodiment of the parallel image processing apparatus according to the present invention, by referring to FIGS. 32 and 33. In FIGS. 32 and 33, those parts which are basically the same as those corresponding parts in FIGS. 27 through 29 are designated by the same reference numerals, and a description thereof will be omitted.

In this seventh embodiment, a light receiving element pair 100 has the light receiving part 63a of the center element 63 and the light receiving parts 64a of the two peripheral elements arranged vertically. Such light receiving element pairs 100 are arranged horizontally so as to improve the density of the light receiving elements.

Next, a description will be given of an eighth embodiment of the parallel image processing apparatus according to the present invention, by referring to FIGS. 34 through 37. In FIGS. 34 through 37, those parts which are basically the same as those corresponding parts in FIGS. 27 through 30 are designated by the same reference numerals, and a description thereof will be omitted.

Figure 37A:
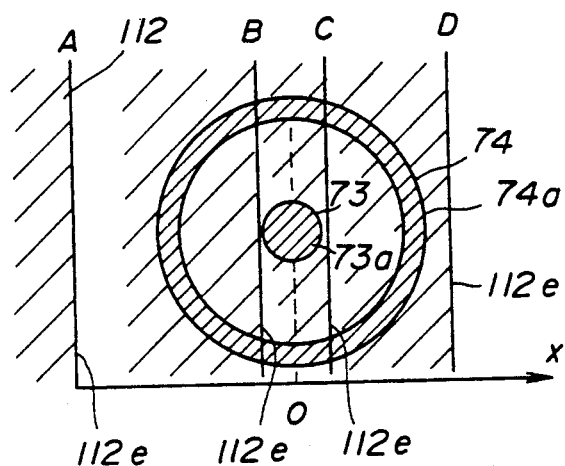
FIGS. 37A and 37B respectively are diagrams for explaining an edge detection operation of the eighth embodiment.
Figure 37B:
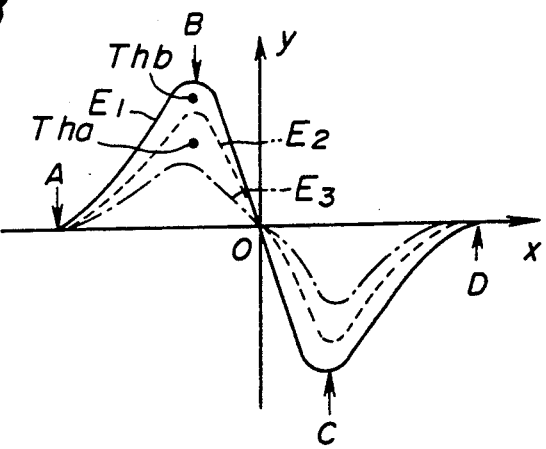

In this eighth embodiment, a light receiving element pair 110 comprises a center element 73 and a peripheral element 74. A light receiving part 73a of the center element 73 has a circular shape. A light receiving part 74a of the peripheral element 74 has a ring shape which surrounds the center element 73 and is concentric to the light receiving part 73a of the center element 73. When detecting the edge of the character part and the like, it is possible to detect the edge regardless of the direction in which the edge extends. The differential output is derived from the outputs of the elements 73 and 74 similarly to the sixth embodiment shown in FIG. 29 as may be seen from FIGS. 37A and 37B. FIGS. 37A and 37B respectively correspond to FIGS. 30A and 30B.

Figure 38:
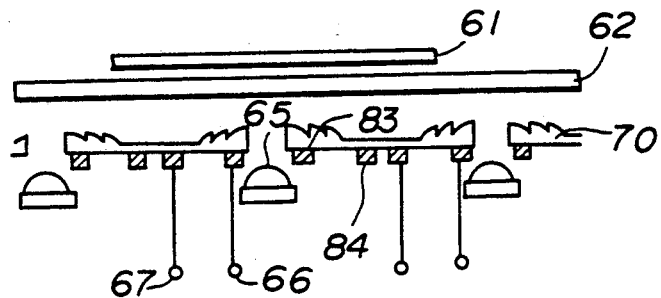
FIGS. 38 and 39 respectively are diagrams showing essential parts of a ninth embodiment of the parallel image processing apparatus according to the present invention.
Figure 39:
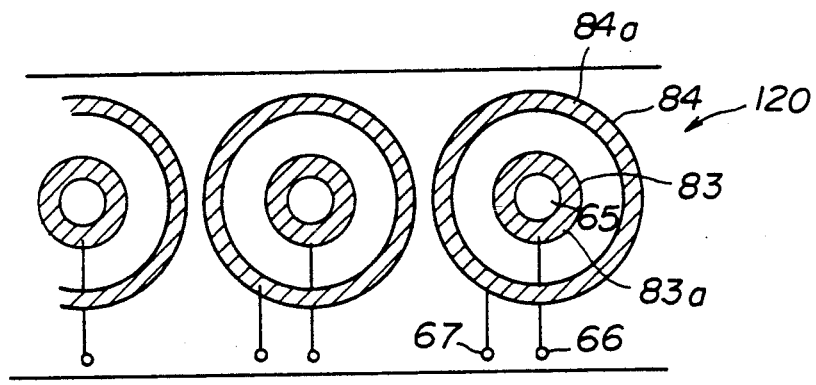

Next, a description will be given of a ninth embodiment of the parallel image processing apparatus according to the present invention, by referring to FIGS. 38 and 39. In FIGS. 38 and 39, those parts which are basically the same as those corresponding parts in FIGS. 27 through 29 are designated by the same reference numerals, and a description thereof will be omitted.

In this ninth embodiment, a light receiving element pair 120 has a center element 83 and a peripheral element 84. The center element 83 has a light receiving part 83a which has a ring shape, and the peripheral element 84 has a light receiving part 84a which also has a ring shape which surrounds the center element 83 and is concentric to the light receiving part 83a. In addition, a Fresnel lens array 70 is arranged between the light receiving element pair 120 and the protection glass 62.

According to this embodiment, the directivity of the center element 83 in the light receiving direction is improved by the provision of the Fresnel lens array 70. For this reason, it is possible to improve the resolution of the image. In addition, since the light source 65 is provided at the central part of the ring-shaped light receiving element, it is possible to eliminate the directional dependency of the edge detection due to the non-uniform characteristic of the light which irradiates the document 61.

Figure 34:
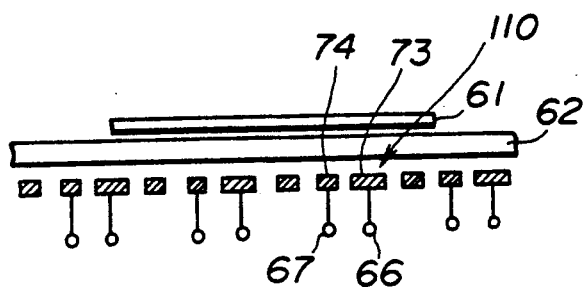
FIGS. 34, 35 and 36 respectively are diagrams showing essential parts of an eighth embodiment of the parallel image processing apparatus according to the present invention.
Figure 35:
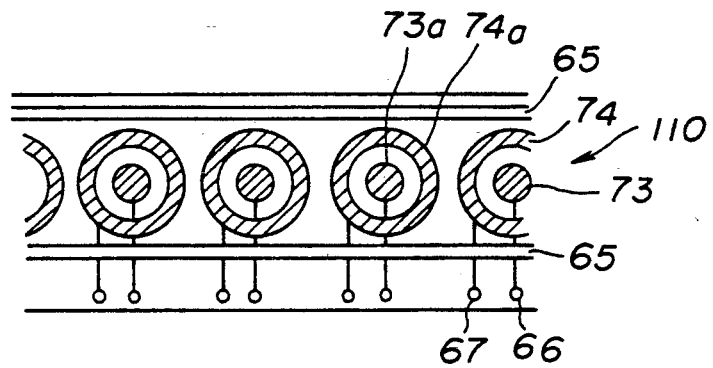
Figure 36:
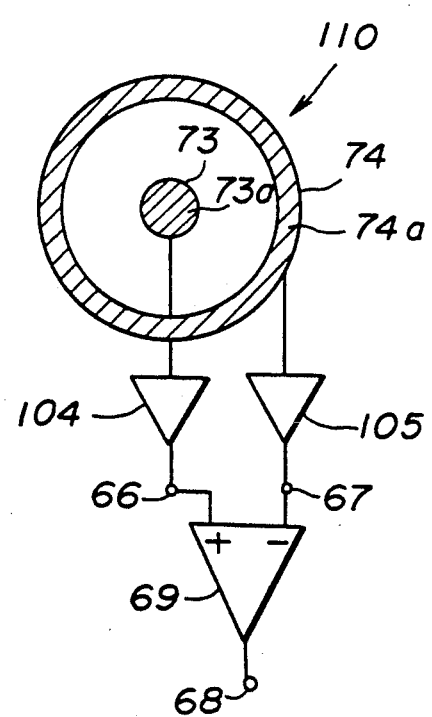
Figure 40:
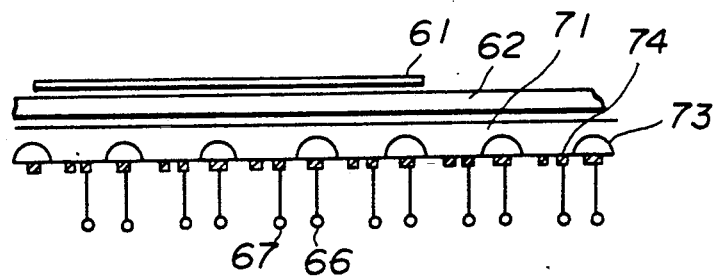
FIGS. 40 and 41 respectively are diagrams showing essential parts of a tenth embodiment of the parallel image processing apparatus according to the present invention.
Figure 41:
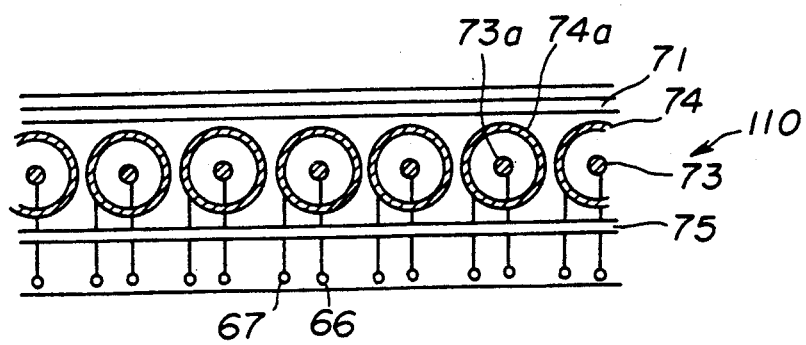

Next, a description will be given of a tenth embodiment of the parallel image processing apparatus according to the present invention, by referring to FIGS. 40 and 41. In FIGS. 40 and 41, those parts which are basically the same as those corresponding parts in FIGS. 34 through 36 are designated by the same reference numerals, and a description thereof will be omitted.

In this tenth embodiment, a plate-shaped lens array 71 is arranged between the protection glass 62 and the light receiving element pair 110. The directivity of the center element 73 is improved by the provision of the lens array 71. As a result, it is possible to improve the resolution.

Next, a description will be given of an eleventh embodiment of the parallel image processing apparatus according to the present invention, by referring to FIG. 42. In FIG. 42, those parts which are basically the same as those corresponding parts in FIGS. 34 through 36, 40 and 41 are designated by the same reference numerals, and a description thereof will be omitted.

In this eleventh embodiment, the document 61 is imaged on a diffusion surface 133 by the imaging lens 72. This diffusion surface 133 is formed on one side of the lens array 71. The center element 73 is positioned below the lens of the lens array 71. The ring-shaped peripheral element 74 surrounds the center element 73.

According to this embodiment, the light receiving element pair 110 detects the light which is diffused by the diffusion surface 133 so as to carry out the edge detection operation.

As a modification of this eleventh embodiment, it is possible to make both or one of the imaging lens 72 and the lens array 71 movable in the direction of the optical axis of the imaging lens 72, so that the magnification of the image formed on the diffusion surface 133 is variable. By this modification, the edge detection can be made depending on whether the character part of the document 61 is densely or coarsely filled by characters and the like.

Next, a description will be given of an twelfth embodiment of the parallel image processing apparatus according to the present invention, by referring to FIGS. 43 and 44. In FIGS. 43 and 44, those parts which are basically the same as those corresponding parts in FIGS. 34 through 36 are designated by the same reference numerals, and a description thereof will be omitted.

In this twelfth embodiment, there is provided a scanner 123 in which the light receiving element pairs 110 are arranged one-dimensionally. This scanner 110 scans along the protection glass 62. A tone detecting sensor 76 is provided in front of the scanner 110. This tone detecting sensor 76 is movable together with the scanner 110.

When the scanner 110 makes a scan, the tone of the document 61 on the protection glass 62 is detected, and the threshold values Tha and Thb are set based on the detected tone. In other words, when the tone of the document 61 is low, the threshold values Tha and Thb are set to large values. On the other hand, the threshold values Tha and Thb are set to small values when the tone of the document 61 is high. Accordingly, it is possible to make the edge detection depending on the change in the tone of the document 61.

In the described embodiments and the sixth through twelfth embodiments in particular, the tone of the copied image is adjusted depending on whether the detected edge belongs to the character part, the picture part, the photograph part or the blank part. However, the concept of these embodiments may be used to make a copy print by classifying the character part or the like and then extracting only the character part from the document, for example. In addition, the sixth through twelfth embodiments may be applied similarly to image forming apparatuses other than the copying machine, such as a facsimile machine and various types of printers.

Further, the present invention is not limited to these embodiments, but various variations and modifications may be made without departing from the scope of the present invention.

What is claimed is:

1. A parallel image processing apparatus, comprising:
   a) a light diffusing member located at an imaging position;
   b) a photoelectric conversion layer including a plurality of photoelectric conversion elements that are arranged for receiving light diffused by the light diffusing member, wherein:
      1) the plurality of photoelectric conversion elements include at least one pair of photoelectric conversion elements, each pair including:
         i) a center element; and
         ii) a peripheral element which surrounds the center element;
      2) the photoelectric conversion elements correspond to respective receptive regions on the light diffusing member, wherein points on the light diffusing member are defined as being in the receptive of a particular photoelectric conversion element when light diffused by the points is received by the particular photoelectric conversion element; and
      3) the receptive regions are distributed on the light diffusing member; and
   c) an edge detection layer which includes a plurality of edge detection elements, wherein:
      1) at least some of the edge detection elements differentially amplifying outputs of the at least one pair of photoelectric conversion elements, the result of differential amplification being a signal E; and
      2) the edge detection layer generates edge information which is a function of weighted sums of at least one of the conversion element output signals, the edge information describing the edge of the image.

2. The parallel image processing apparatus as claimed in claim 1 wherein said center element has a circular light receiving part, and said peripheral element has a ring-shaped light receiving part which surrounds said center element.

3. The parallel image processing apparatus as claimed in claim 2 wherein said ring-shaped light receiving part of said peripheral element projects from said circular light receiving part of said center element in a direction towards said light diffusing member.

4. The parallel image processing apparatus as claimed in claim 2 wherein said center element and said peripheral element are formed on a single substrate.

5. The parallel image processing apparatus as claimed in claim 2 wherein said center element, said peripheral element and said edge detection element are formed on a single substrate.

6. The parallel image processing apparatus as claimed in claim 1 wherein a distance between said light diffusing member and said photoelectric conversion layer is variable.

7. The parallel image processing apparatus as claimed in claim 1, further comprising:
   a refractive light transmission member which is arranged between said light diffusing member and said photoelectric conversion layer so as to improve the light receiving characteristic of the center element over the light receiving characteristic of the peripheral element.

8. The parallel image processing apparatus as claimed in claim 7 wherein said center element has a circular light receiving part, and said peripheral element has a ring-shaped light receiving part which surrounds said center element.

9. The parallel image processing apparatus as claimed in claim 7 wherein said center element has a ring-shaped light receiving part, and said peripheral element has a ring-shaped light receiving part which surrounds said center element.

10. The parallel image processing apparatus as claimed in claim 7 wherein said center element and said peripheral element are formed on a single substrate.

11. The parallel image processing apparatus as claimed in claim 7 wherein said center element, said peripheral element and said edge detection element are formed on a single substrate.

12. The parallel image processing apparatus as claimed in claim 7 wherein a distance between said light diffusing member and said photoelectric conversion layer is variable.

13. The parallel image processing apparatus as claimed in claim 7 wherein said refractive light transmission member comprises a Fresnel lens.

14. The parallel image processing apparatus as claimed in claim 1 wherein said edge detection layer includes:
   comparing means for comparing the signal E with a plurality of threshold values for contributing to a determination of the kind of the image, including a character, a picture or photograph, and a blank.

15. The parallel image processing apparatus as claimed in claim 14 wherein:
   said comparing means compares the signal E with first and second threshold values Tha and Thb, wherein:
      said first threshold value Tha is used to distinguish the character from the picture or photograph,
      said second threshold value Thb is used to distinguish the picture or photograph from the blank.

16. The parallel image processing apparatus as claimed in claim 15 wherein:
   said comprising means compares (1) maximum value of the signal E from one of the edge detection elements with (2) said first and second threshold values Tha and Thb.

17. The parallel image processing apparatus as claimed in claim 16 further comprising:

classifying means for classifying an edge of the image as belonging to:
(a) the blank when $0<|E|\leq Tha$;
(b) the picture or photograph when $Tha<|E|\leq Thb$; and
(c) the character when $Thb<|E|$.

18. The parallel image processing apparatus as claimed in claim 14 which is applied to a copying machine.

19. The parallel image processing apparatus as claimed in claim 14 which is applied to a facsimile machine.

20. The parallel image processing apparatus as claimed in claim 14 which is applied to a printer.

21. The parallel image processing apparatus of claim 1, wherein:
the edge detection layer includes first means for summing plural signals from respective plural center elements and second means for summing plural signals from respective plural peripheral elements, summed values from the first means for summing and the second means for summing being differentially amplified for forming the edge information.

* * * * *